US011201972B2

(12) United States Patent
Tomii

(10) Patent No.: US 11,201,972 B2
(45) Date of Patent: Dec. 14, 2021

(54) IMAGE FORMING APPARATUS WHICH ACCEPTS MULTIPLE TYPES OF TEST SHEETS FOR CALIBRATION OF IMAGE DENSITY AND GEOMETRIC CHARACTERISTICS

(71) Applicant: CANON KABUSHIKI KAISHA, Tokyo (JP)

(72) Inventor: Hiroshi Tomii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/011,551

(22) Filed: Sep. 3, 2020

(65) Prior Publication Data

US 2021/0075918 A1 Mar. 11, 2021

(30) Foreign Application Priority Data

Sep. 11, 2019 (JP) .............................. JP2019-165383

(51) Int. Cl.
 *H04N 1/00* (2006.01)
(52) U.S. Cl.
 CPC ..... *H04N 1/00087* (2013.01); *H04N 1/00031* (2013.01); *H04N 1/00925* (2013.01)
(58) Field of Classification Search
 CPC ........... H04N 1/00087; H04N 1/00031; H04N 1/00925; H04N 1/00045; G06K 15/027; G06K 15/021; G06K 15/14

USPC ....................................... 358/1.9, 1.14, 1.15
See application file for complete search history.

(56) References Cited

U.S. PATENT DOCUMENTS

| 9,560,229 | B2 | 1/2017 | Maeda ................ H04N 1/00708 |
| 10,498,929 | B2 | 12/2019 | Tomii ...................... G03G 15/55 |
| 2011/0317175 | A1* | 12/2011 | Murayama ........... G06K 15/002 358/1.2 |
| 2013/0094875 | A1* | 4/2013 | Ogata ................ G03G 15/0189 399/74 |

FOREIGN PATENT DOCUMENTS

JP 2008-117200 5/2008

* cited by examiner

*Primary Examiner* — Kent Yip
(74) *Attorney, Agent, or Firm* — Venable LLP

(57) ABSTRACT

An image forming apparatus includes an image forming unit configured to form an image, a conveying unit configured to convey a sheet on which the image is formed, a reader configured to read the sheet conveyed by the conveying unit and a controller. The controller is configured to execute first calibration in which a density of an image to be formed by the image forming unit is controlled based on a result of reading by the reader, and execute second calibration in which a geometric characteristic of an image to be formed by the image forming unit is controlled based on a result of reading by the reader. The controller allows usage of a sheet of a first type in the first type of calibration, wherein the controller prevents usage of a sheet of a second type in the first type of calibration.

12 Claims, 18 Drawing Sheets

| SHEET NAME | WIDTH (mm) | LENGTH (mm) | BASIS WEIGHT (g/m^2) | SURFACE PROPERTY | COLOR | PREPRINTED SHEET | POSITIONAL DEVIATION AMOUNT (FRONT SURFACE) | POSITIONAL DEVIATION AMOUNT (BACK SURFACE) |
|---|---|---|---|---|---|---|---|---|
| ABC PAPER RECYCLED 1 | 210 | 297 | 75 | PLAIN PAPER | WHITE | No | LEAD POSITION : 0.30mm<br>SIDE POSITION : -0.1mm<br>MAIN-SCANNING MAGNIFICATION : +0.02%<br>SUB-SCANNING MAGNIFICATION : +0.01% | LEAD POSITION : 0.20mm<br>SIDE POSITION : 0.10mm<br>MAIN-SCANNING MAGNIFICATION : +0.02%<br>SUB-SCANNING MAGNIFICATION : -0.03% |
| ABC PAPER RECYCLED 2 | 297 | 420 | 75 | PLAIN PAPER | WHITE | No | LEAD POSITION : 0.00mm<br>SIDE POSITION : 0.00mm<br>MAIN-SCANNING MAGNIFICATION : +0.00%<br>SUB-SCANNING MAGNIFICATION : +0.00% | LEAD POSITION : 0.00mm<br>SIDE POSITION : 0.00mm<br>MAIN-SCANNING MAGNIFICATION : +0.00%<br>SUB-SCANNING MAGNIFICATION : +0.00% |
| DEF PAPER EMBOSSED PAPER A-1 | 216 | 279 | 170 | EMBOSSED | WHITE | No | LEAD POSITION : 0.50mm<br>SIDE POSITION : -0.50mm<br>MAIN-SCANNING MAGNIFICATION : +0.02%<br>SUB-SCANNING MAGNIFICATION : +0.02% | LEAD POSITION : -0.30mm<br>SIDE POSITION : 0.50mm<br>MAIN-SCANNING MAGNIFICATION : +0.01%<br>SUB-SCANNING MAGNIFICATION : -0.03% |
| DEF PAPER COATED PAPER P-1 | 279 | 432 | 128 | BOTH SIDES COATED | WHITE | No | LEAD POSITION : 0.40mm<br>SODE POSITION : -0.20mm<br>MAIN-SCANNING MAGNIFICATION : +0.12%<br>SUBA-SCANNING MAGNIFICATION : +0.08% | LEAD POSITION : -0.20mm<br>SIDE POSITION : 0.60mm<br>MAIN-SCANNING MAGNIFICATION : +0.02%<br>SUB-SCANNING MAGNIFICATION : -0.01% |
| XYZ PAPER COLOR 81 | 210 | 297 | 75 | PLAIN PAPER | ORANGE | No | LEAD POSITION : 0.00mm<br>SIDE POSITION : 0.00mm<br>MAIN-SCANNING MAGNIFICATION : +0.00%<br>SUB-SCANNING MAGNIFICATION : +0.00% | LEAD POSITION : 0.00mm<br>SIDE POSITION : 0.00mm<br>MAIN-SCANNING MAGNIFICATION : +0.00%<br>SUB-SCANNING MAGNIFICATION : +0.00% |
| XYZ PAPER COLOR 82 | 210 | 297 | 75 | PLAIN PAPER | PINK | No | LEAD POSITION : 0.00mm<br>SIDE POSITION : 0.00mm<br>MAIN-SCANNING MAGNIFICATION : +0.00%<br>SUB-SCANNING MAGNIFICATION : +0.00% | LEAD POSITION : 0.00mm<br>SIDE POSITION : 0.00mm<br>MAIN-SCANNING MAGNIFICATION : +0.00%<br>SUB-SCANNING MAGNIFICATION : +0.00% |
| FGH PAPER GRID 75 | 210 | 297 | 75 | PLAIN PAPER | WHITE | Yes | LEAD POSITION : 0.00mm<br>SIDE POSITION : 0.00mm<br>MAIN-SCANNING MAGNIFICATION : +0.00%<br>SUB-SCANNING MAGNIFICATION : +0.00% | LEAD POSITION : 0.00mm<br>SIDE POSITION : 0.00mm<br>MAIN-SCANNING MAGNIFICATION : +0.00%<br>SUB-SCANNING MAGNIFICATION : +0.00% |
| FGH PAPER PLAIN PAPER 2 | 210 | 297 | 75 | PLAIN PAPER | WHITE | No | LEAD POSITION : -0.03mm<br>SIDE POSITION : -0.07mm<br>MAIN-SCANNING MAGNIFICATION : +0.06%<br>SUB-SCANNING MAGNIFICATION : +0.01% | LEAD POSITION : -0.03mm<br>SIDE POSITION : -0.10mm<br>MAIN-SCANNING MAGNIFICATION : -0.04%<br>SUB-SCANNING MAGNIFICATION : +0.02% |

FIG. 8

SHEET MANAGEMENT TABLE EDIT — 1100

| SHEET NAME | WIDTH (mm) | LENGTH (mm) | BASIS WEIGHT (g/m^2) | SURFACE PROPERTY | COLOR | |
|---|---|---|---|---|---|---|
| ABC PAPER RECYCLE 1 | 210 | 297 | 75 | PLAIN PAPER | WHITE | △ |
| ABC PAPER RECYCLE 2 | 297 | 420 | 75 | PLAIN PAPER | WHITE | |
| DEF PAPER EMBOSSED PAPER A-1 | 216 | 279 | 170 | EMBOSSED | WHITE | |
| DEF PAPER COATED PAPER P-1 | 279 | 432 | 128 | BOTH SIDES COATED | WHITE | |
| XYZ PAPER COLOR 81 | 210 | 297 | 75 | PLAIN PAPER | ORANGE | |
| XYZ PAPER COLOR 82 | 210 | 297 | 75 | PLAIN PAPER | PINK | ▽ |

1101 ADD NEW SHEET   1102 EDIT   DELETE   1103 ADJUST PRINTING POSITION

FIG. 9A

SHEET ATTRIBUTE EDIT — 1110

- SHEET NAME: XYZ PAPER COLOR 81
- WIDTH (mm): 210
- LENGTH (mm): 297
- BASIS WEIGHT (g/m^2): 75
- SURFACE PROPERTY: PLAIN PAPER ▼
- COLOR: WHITE ▼
- PREPRINTED PAPER: ✓

1111 END EDIT   CANCEL

| | MEASUREMENT VALUE | IDEAL VALUE | POSITIONAL DEVIATION AMOUNT |
|---|---|---|---|
| LEAD POSITION (FRONT SURFACE) | (c+e)/2 | 1cm | MEASUREMENT VALUE − IDEAL VALUE |
| SIDE POSITION (FRONT SURFACE) | (f+j)/2 | 1cm | MEASUREMENT VALUE − IDEAL VALUE |
| MAIN-SCANNING MAGNIFICATION (FRONT SURFACE) | ((b−d−f)+(b−h−j))/2 | SHEET LENGTH IN MAIN-SCANNING DIRECTION − 2cm | (MEASUREMENT VALUE − IDEAL VALUE) / IDEAL VALUE |
| SUB-SCANNING MAGNIFICATION (FRONT SURFACE) | ((a−c−g)−(a−e−i))/2 | SHEET LENGTH IN SUB-SCANNING DIRECTION − 2cm | (MEASUREMENT VALUE − IDEAL VALUE) / IDEAL VALUE |
| LEAD POSITION (BACK SURFACE) | (k+m)/2 | 1cm | MEASUREMENT VALUE − IDEAL VALUE |
| SIDE POSITION (BACK SURFACE) | (n+r)/2 | 1cm | MEASUREMENT VALUE − IDEAL VALUE |
| MAIN-SCANNING MAGNIFICATION (BACK SURFACE) | ((b−l−n)+(b−p−r))/2 | SHEET LENGTH IN MAIN-SCANNING DIRECTION − 2cm | (MEASUREMENT VALUE − IDEAL VALUE) / IDEL VALUE |
| SUB-SCANNING MAGNIFICATION (BACK SURFCE) | ((a−k−o)+(a−m−q))/2 | SHEET LENGTH IN SUB-SCANNING DIRECTION − 2cm | (MEASUREMENT VALUE − IDEAL VALUE) / IDEAL VALUE |

FIG. 11

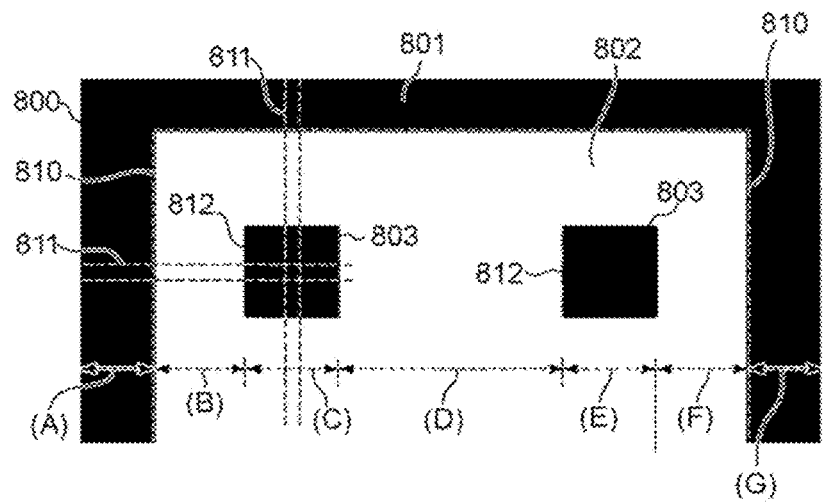
FIG. 12A
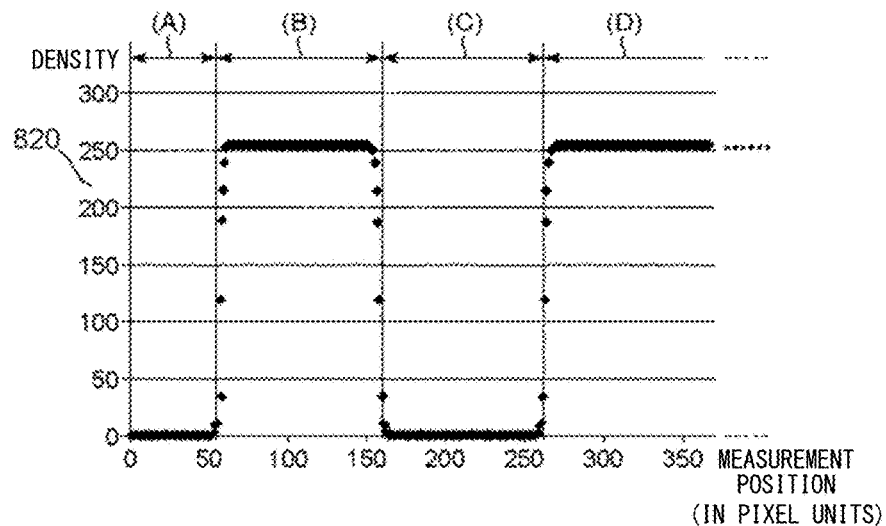
FIG. 12B
| CALIBRATION TYPE | FIRST SHEET TYPE | SECOND SHEET TYPE | THIRD SHEET TYPE | FOURTH SHEET TYPE |
|---|---|---|---|---|
| PRINTING POSITION ADJUSTMENT CALIBRATION | PLATEN READING | ADF READING PLATEN READING | ADF READING PLATEN READING | PLATEN READING |
| TONE CORRECTION CALIBRATION | PLATEN READING | PLATEN READING | ADF READING PLATEN READING | PLATEN READING |
FIG. 13

IMAGE FORMING APPARATUS WHICH ACCEPTS MULTIPLE TYPES OF TEST SHEETS FOR CALIBRATION OF IMAGE DENSITY AND GEOMETRIC CHARACTERISTICS

BACKGROUND OF THE INVENTION

Field of the Invention

The present disclosure relates to calibration to be executed by an image forming apparatus.

Description of the Related Art

An image forming apparatus such as a copying machine or a multifunction peripheral includes an image reading apparatus for reading an image from an original. The image reading apparatus including an auto document feeder can read an image by two types of reading methods, namely, "fixed reading" of reading an original placed on an original table, and "flow reading" of reading an original conveyed by the auto document feeder.

The fixed reading (platen reading) is performed under a state in which a sheet original or a book (or booklet) is placed on a transparent original table, for example, a glass. In the fixed reading, a carriage accommodating an optical system configured to deflect light reflected by an original toward a sensor reads the original during movement. In the flow reading (ADF reading), originals placed on an original tray of the auto document feeder are conveyed to a reading position one by one. In the flow reading, the carriage reads an original that passes through a reading position under a state in which the carriage is stopped right under the reading position.

The flow reading imposes a lower work load on a user than the fixed reading. This is because, in the case of the flow reading, the user is only required to place originals on the original tray, and is not required to manually place originals on the original table one by one as in the case of the fixed reading. In particular, a difference in work load becomes significant when a plurality of originals are read in succession.

An electrophotographic image forming apparatus can execute calibration of adjusting an image forming condition by using an image reading apparatus to read a test chart formed by printing a test image on a sheet. The calibration includes, for example, "tone correction" of correcting a tone characteristic of the image forming apparatus and "printing position adjustment" of adjusting a geometric characteristic of an image formed on a sheet.

In U.S. patent Ser. No. 10/498,929 B2, there is disclosed a technology of determining, in the "tone correction", whether to allow an auto document feeder to be used depending on the type of sheet on which a test image is printed. In U.S. Pat. No. 9,560,229 B2, there is disclosed a technology of determining, in the "printing position adjustment", whether to allow an auto document feeder to be used depending on the type of sheet on which a test image is printed. In the technologies of U.S. patent Ser. No. 10/498,929 B2 and U.S. Pat. No. 9,560,229 B2, the flow reading is performed at the time of calibration to improve efficiency of calibration. In Japanese Patent Application Laid-open No. 2008-117200, a configuration of executing calibration by using an image reading apparatus arranged inline and downstream of the image forming apparatus is used to improve the efficiency of calibration.

When calibration is executed by using the auto document feeder or the inline image reading apparatus, the image reading apparatus reads a test image from a test chart being conveyed. A test chart may flutter due to conveyance thereof depending on the type of sheet to be used for the test chart. This causes a change in distance between the test chart and a reading sensor. The change in distance between the test chart and the reading sensor influences the result of reading a test image. As a result, in the flow reading, a reading error due to the distance between the test chart and the reading sensor becomes larger compared to the fixed reading, which leads to a possibility that an accuracy of calibration cannot be ensured depending on the sheet type. Further, the accuracy of reading a test chart required for calibration differs depending on the calibration type. This is because a detection target differs depending on the calibration type. Accordingly, it is a main object of the present disclosure to provide an image forming apparatus with which an accuracy required for calibration is ensured while at the same time improving the efficiency of calibration.

SUMMARY OF THE INVENTION

An image forming apparatus according to the present disclosure includes:
an image forming unit configured to form an image; a conveying unit configured to convey a sheet on which the image is formed; a reader configured to read the sheet conveyed by the conveying unit; and a controller configured to: execute first calibration in which a density of an image to be formed by the image forming unit is controlled based on a result of reading by the reader; and execute second calibration in which a geometric characteristic of an image to be formed by the image forming unit is controlled based on a result of reading by the reader, and wherein the controller allows usage of a sheet of a first type in the first type of calibration, wherein the controller prevents usage of a sheet of a second type in the first type of calibration, wherein the controller allows usage of a sheet of the first type in the second type of calibration, and wherein the controller allows usage of a sheet of the second type in the second type of calibration.

Further features of the present invention will become apparent from the following description of exemplary embodiments (with reference to the attached drawings).

BRIEF DESCRIPTION OF THE DRAWINGS

FIG. 8 is an exemplary illustration of a sheet management table.

FIG. 9A and FIG. 9B are exemplary diagrams of edit screens.

FIG. 11 is an explanatory table of a method of detecting a deviation amount of a geometric characteristic.

FIG. 12A and FIG. 12B are explanatory diagrams of processing of analyzing the adjustment chart.

FIG. 13 is an explanatory table of a relationship among a calibration type, a sheet type, and a reading mode.

DESCRIPTION OF THE EMBODIMENTS

Now, at least one embodiment of the present disclosure is described with reference to the accompanying drawings.
<Image Forming Apparatus>

Figure 1:
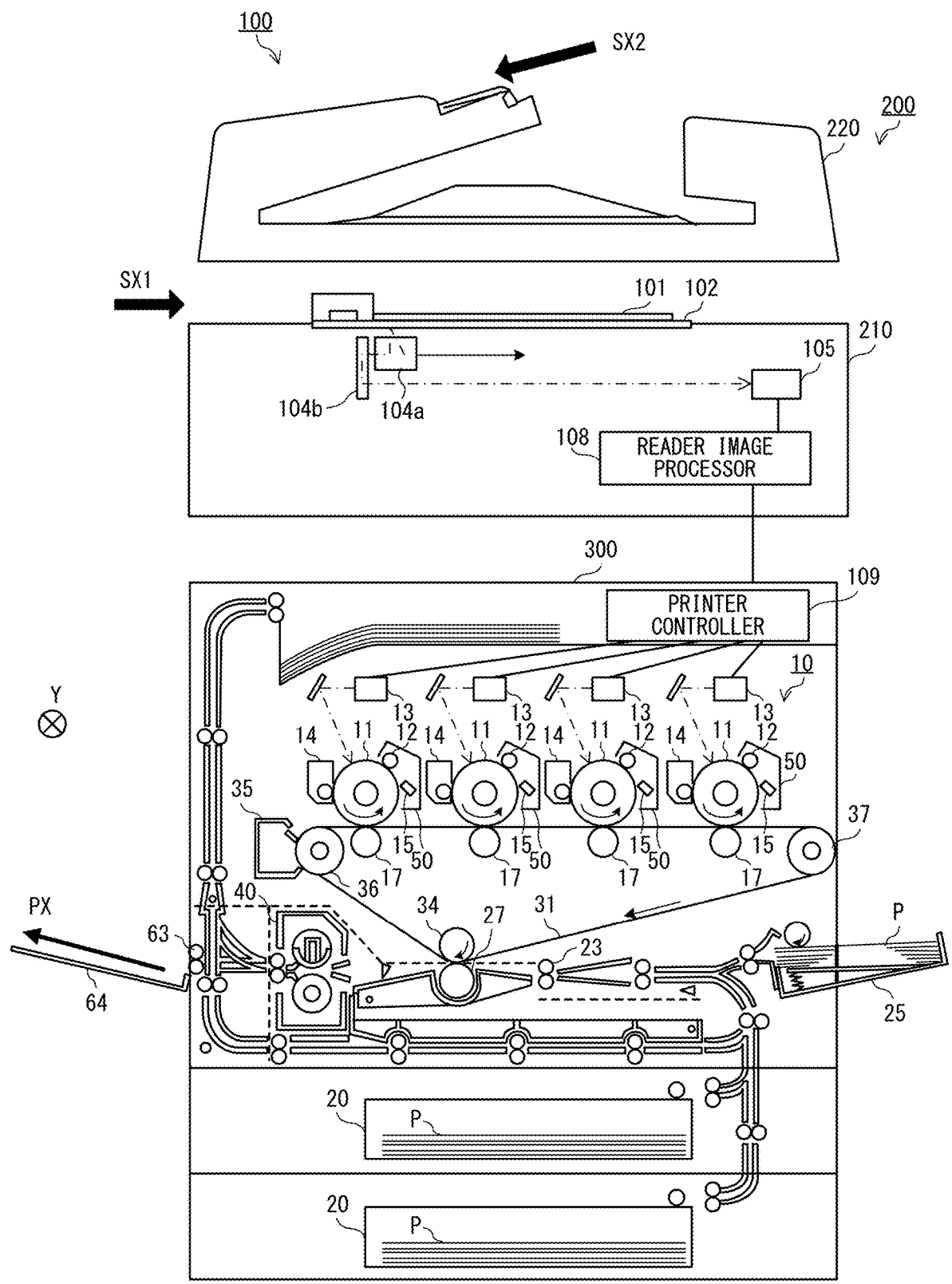
FIG. 1 is a configuration diagram of an image forming apparatus according to at least one embodiment of the present disclosure.

FIG. 1 is a configuration diagram of an image forming apparatus. An image forming apparatus 100 includes a reader 200, which is an image reading apparatus configured to read an image from an original, and a printer 300 configured to print the image on a sheet. The reader 200 includes a document scanner 210 and an automatic document feeder (hereinafter referred to as "ADF unit") 220. The document scanner 210 is provided on the printer 300, and the ADF unit 220 is provided on the document scanner 210. The reader 200 is configured to read an image printed on an original 101, and transmit an image signal, which represents the read image, to the printer 300. The printer 300 can perform printing processing (image formation processing) for the sheet based on the image signal acquired from the reader 200.

A direction of conveyance of the sheet by the image forming apparatus 100 is defined as a PX-direction, and a direction perpendicular to the PX-direction is defined as a Y-direction. Moreover, a direction of paper feeding by the ADF unit 220 is defined as an SX2-direction, and a moving direction of a first mirror unit 104a and a second mirror unit 104b included in the document scanner 210 is defined as an SX1-direction.

The reader 200 is configured to read an original fed by the ADF unit 220, and the original 101 placed on a platen 102 provided on a side of the document scanner 210 that is close to the ADF unit 220. The document scanner 210 includes therein an image sensor 105 and a reader image processor 108. The reader image processor 108 is configured to convert an electrical signal, which is generated by the image sensor 105 by reading the original 101, into an image signal, and transmit the image signal to the printer 300.

The printer 300 includes therein a printer controller 109. The printer controller 109 is configured to acquire the image signal from the reader image processor 108 of the document scanner 210. The printer controller 109 includes an electrophotographic image forming engine 10 configured to form an image on a sheet P based on the acquired image signal. The image forming engine 10 includes four image forming units for forming images of respective colors, namely, yellow (Y), magenta (M), cyan (C), and black (K). The printer 300 includes an intermediate transfer belt 31 and a fixing device 40. The printer 300 can also be applied to monochrome printing by using only the image forming unit for black color.

The four image forming units correspond to respective colors of yellow, magenta, cyan, and black in order from the left side of FIG. 1. Each image forming unit includes a photosensitive drum 11. A charging device 12 having a roller shape, an exposure device 13, a developing device 14, a primary transfer device 17, a drum cleaner 15, and other components are arranged around each photosensitive drum 11. In the following, a procedure of forming a black toner image is described as a representative example of four colors. Procedures of forming toner images of other colors are similar to that of forming a black toner image.

When the image formation is started, the photosensitive drum 11 rotates in the arrow direction. The charging device 12 uniformly charges the surface of the photosensitive drum 11. The exposure device 13 forms an electrostatic latent image by exposing the surface of the photosensitive drum 11 with a laser beam modulated in accordance with an instruction from the printer controller 109. The developing device 14 develops an image by causing toner to adhere to the electrostatic latent image, to thereby form a toner image. The primary transfer device 17 primarily transfers the toner image formed on the photosensitive drum 11 onto the intermediate transfer belt 31. The drum cleaner 15 removes a toner remaining on the photosensitive drum 11 after the transfer. In this manner, the photosensitive drum 11 is ready to form a next image. The drum cleaner 15 is configured to cause a cleaning blade formed of an elastic material to be in contact with the surface of the photosensitive drum 11. However, the drum cleaner 15 may be configured to cause a fur brush to be in contact with the surface of the photosensitive drum 11 to remove remaining toner.

The intermediate transfer belt 31 is hung over three rollers 34, 36, and 37, and is rotated in the clockwise direction of FIG. 1. The intermediate transfer belt 31 is an image bearing member configured to bear a toner image transferred from the photosensitive drum 11, and is configured to convey the toner image toward the roller 34 side through rotation. The roller 34 and a secondary transfer device 27, which is arranged at a position opposed to the roller 34 with respect to the intermediate transfer belt 31, form a secondary transfer unit. A transfer cleaner 35 is arranged at a position opposed to the roller 36 with respect to the intermediate transfer belt 31.

The sheet P is fed from a sheet feeding cassette 20 or a manual feed tray 25.

When the sheet P is fed from the sheet feeding cassette 20 or the manual feed tray 25, the sheet P is conveyed to a registration roller pair 23 through a conveying path. The registration roller pair 23 temporarily stops the conveyed sheet P, and corrects skew feeding in the conveying direction of the sheet P.

The registration roller pair 23 delivers the sheet P to a position (secondary transfer unit) between the intermediate transfer belt 31 and the secondary transfer device 27 in accordance with a timing at which the toner image borne on the intermediate transfer belt 31 is conveyed to the secondary transfer unit. The secondary transfer device 27 transfers the toner image on the intermediate transfer belt 31 onto the sheet P. The transfer cleaner 35 removes toner remaining on the intermediate transfer belt 31. In this manner, the intermediate transfer belt 31 is ready to form a next image.

The sheet P having the toner image formed thereon is conveyed to the fixing device 40 by the secondary transfer device 27. The fixing device 40 fixes the toner image to the sheet P. For example, the fixing device 40 heats and melts the toner image and applies pressure thereto to fix the toner image to the sheet P. In this manner, an image is formed on the sheet P. The sheet P on which the image is formed is discharged to a discharge tray 64 by discharge rollers 63.

<Document Scanner>

Figure 2:
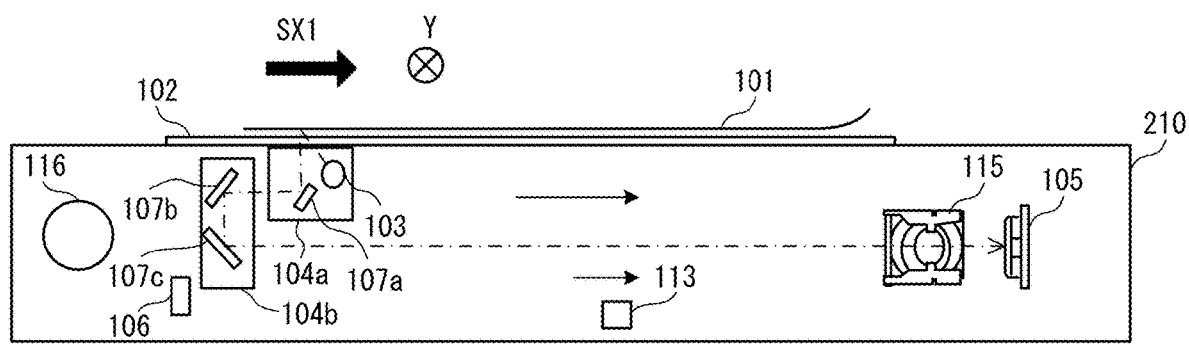
FIG. 2 is a configuration diagram of a document scanner.

FIG. 2 is a configuration diagram of the document scanner 210. In a housing of the document scanner 210, the document scanner 210 includes a first mirror unit 104a, a second mirror unit 104b, an image sensor 105, a lens 115, a motor 116, an original size detection sensor 113, and a home position sensor 106. The first mirror unit 104a includes an original illumination lamp 103 and a first mirror 107a. The second mirror unit 104b includes a second mirror 107b and a third mirror 107c. The first mirror unit 104a and the second mirror unit 104b are movable in the SX1-direction by being driven by the motor 116.

The document scanner 210 can perform image reading processing in accordance with a first reading mode of reading the original 101 being conveyed by the ADF unit 220 and a second reading mode of reading the original 101 placed on the platen 102. The first reading mode is sometimes called "flow reading" or "ADF reading". The second reading mode is sometimes called "fixed reading" or "platen reading".

In the first reading mode, the first mirror unit 104a and the second mirror unit 104b is moved to a flow reading position by the motor 116 and stop. The flow reading position is a reading position at the time of reading the image from the original 101 that is being conveyed by the ADF unit 220. The image sensor 105 reads the image of the original 101 during a period in which the ADF unit 220 is conveying the original 101 on the platen 102.

The document scanner 210 turns on the original illumination lamp 103 to apply light to a reading surface (surface on which an image is printed) of the original 101. The first mirror 107a, the second mirror 107b, and the third mirror 107c deflect reflected light (image light) of the light applied to the original 101 to guide the deflected light to the lens 115. The lens 115 forms an image from the image light onto a light receiving surface of the image sensor 105. The image sensor 105 converts the image light into an electrical signal. The reader image processor 108 acquires the electrical signal from the image sensor 105 to generate an image signal.

At the time of the second reading mode, the motor 116 moves the first mirror unit 104a and the second mirror unit 104b temporarily to a home position, at which the home position sensor 106 is present. On the platen 102, one original is placed with a reading surface thereof directed to the platen 102 side and with its position fixed by the ADF unit 220. The document scanner 210 turns on the original illumination lamp 103 to apply light to the reading surface of the original 101. While being moved in the SX1-direction by the motor 116, the first mirror unit 104a and the second mirror unit 104b deflect the image light from the original 101 by the first mirror 107a, the second mirror 107b, and the third mirror 107c to guide the image light to the lens 115. The lens 115 forms an image from the image light onto the light receiving surface of the image sensor 105. The image sensor 105 converts the image light into an electrical signal. The reader image processor 108 acquires the electrical signal from the image sensor 105 to generate an image signal.

In at least one embodiment, description has been made of a case in which the optical system included in the document scanner 210 is a reduction optical system configured to cause light reflected by the original 101 to form an image on the image sensor 105, for example, a CCD sensor. However, the present disclosure is not limited thereto. The optical system included in the document scanner 210 may be an equal-magnification optical system configured to cause light reflected by the original 101 to form an image on a contact image sensor (CIS).

<ADF Unit>

Figure 3A:
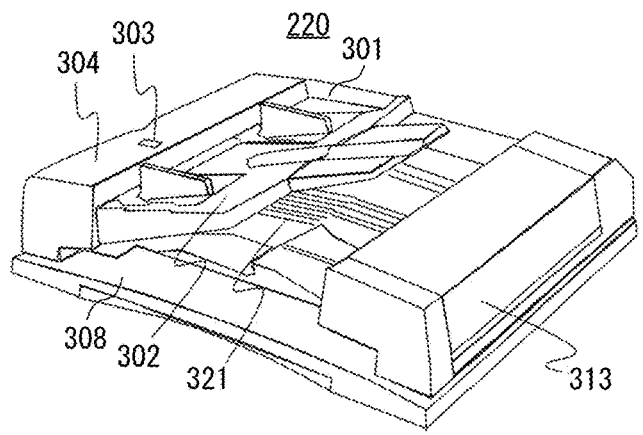
FIG. 3A, FIG. 3B, FIG. 3C, and FIG. 3D are explanatory views of an ADF unit.
Figure 3B:
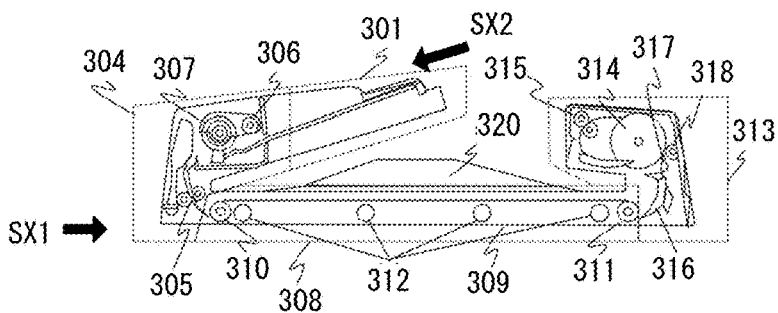
Figure 3C:
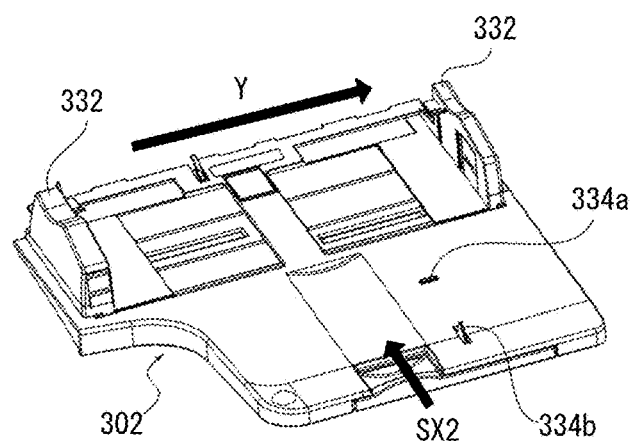
Figure 3D:
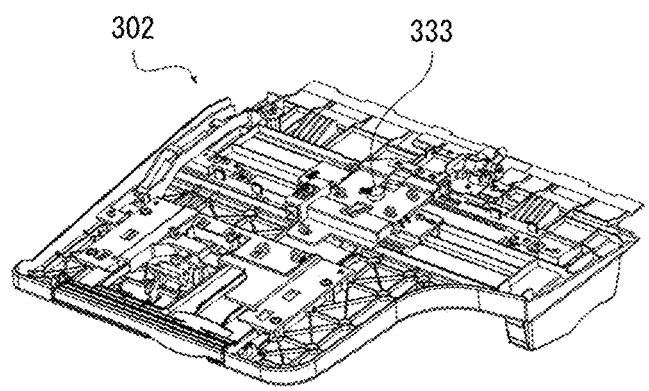

FIG. 3A to FIG. 3D are explanatory diagrams of the ADF unit 220. The ADF unit 220 includes an original stacker 301, an original feeder 304, an original conveyor 308, and a reverse discharge portion 313. FIG. 3A is an external perspective view of the ADF unit 220. FIG. 3B is a view of an internal configuration of the ADF unit 220. FIG. 3C is an oblique view of the original stacker 301 as viewed from the above. FIG. 3D is a view of an internal configuration of the original stacker 301.

The original stacker 301 includes an original tray 302. On the original tray 302, one or more originals 101 can be stacked on a stacking surface thereof. The original tray 302 functions as a feeder. The original stacker 301 is provided with an original indicator 303 configured to turn on when the originals 101 are stacked on the original tray 302. The originals 101 stacked on the original tray 302 are conveyed one by one onto the platen 102 by the original feeder 304, pass on the platen 102, and are discharged to a discharge tray 321 by the reverse discharge portion 313.

In the original feeder 304, a pickup roller 306, a feed roller 307 and a registration roller pair 305 are arranged along a conveying path of the originals 101. The pickup roller 306 is a roller that is rotatable and vertically movable. At the time of feeding the originals 101, the pickup roller 306 is lowered on an uppermost original 101 of an original bundle stacked on the original tray 302 to be brought into contact with this original 101, and conveys this original 101. The feed roller 307 conveys such originals 101, which are conveyed by the pickup roller 306, to the registration roller pair 305. The originals 101 are conveyed one by one by the pickup roller 306 and the feed roller 307. The registration roller pair 305 has stopped at the time when a tip end of each original 101 reaches the registration roller pair 305. This is in order to correct skew feeding of the original 101. The registration roller pair 305 starts to rotate after correcting the skew feeding, and conveys the original 101 to the original conveyor 308.

The original conveyor 308 includes a conveyor belt 309, a drive roller 310, a driven roller 311, and a plurality of pressing rollers 312. The original conveyor 308 conveys the original 101 in the SX1-direction by using the conveyor belt 309. The conveyor belt 309 is tensioned around the drive roller 310 and the driven roller 311. Moreover, the conveyor belt 309 is pressed against the platen 102 by the pressing rollers 312. By frictional force, the conveyor belt 309 conveys the original 101 that enters between the conveyor belt 309 and the platen 102. Thus, the original 101 is conveyed on the platen 102.

In the first reading mode using the ADF unit 220, the first mirror unit 104a and the second mirror unit 104b do not move and the positions thereof are fixed, and the original 101 is conveyed at a fixed speed. The document scanner 210 reads the original 101 under this state. When the back surface of the original 101 is read by using the ADF unit 220, the original 101 may be turned over and conveyed after the front surface of the original 101 is read, and then the back surface may be read. This is referred to as "double-sided reverse reading". Further, when the ADF unit 220 includes two reading sensors that are arranged so as to sandwich the conveying path, the front and back surfaces of the original 101 may be read at the same time while the flow reading is being executed. This is referred to as "double-sided simultaneous reading".

The reverse discharge portion 313 includes a reverse roller 314, a conveying roller pair 315, a reverse flapper 316, a discharge flapper 317, and a reverse roller 318. The reverse discharge portion 313 is configured to reverse the front and back of the original 101 conveyed from the original conveyor 308, and discharge the original 101 to the discharge tray 321 of a discharged sheet stacking portion 320.

At the time of entering the reverse discharge portion 313, the original 101 conveyed by the conveyor belt 309 of the original conveyor 308 is lifted up by the reverse flapper 316 and is conveyed to the reverse roller 314. The original 101 is sandwiched between the reverse roller 314 that rotates counterclockwise (CCW) and the reverse roller 318 that faces the reverse roller 314, and is conveyed to the conveying roller pair 315. When a rear end of the original 101 passes through the discharge flapper 317, the discharge flapper 317 rotates clockwise (CW). Moreover, the reverse roller 314 also rotates clockwise (CW). Thus, the original 101 is conveyed in a switchback manner, and is discharged to the discharge tray 321 of the discharged sheet stacking portion 320.

<Printer Controller>

Figure 4:
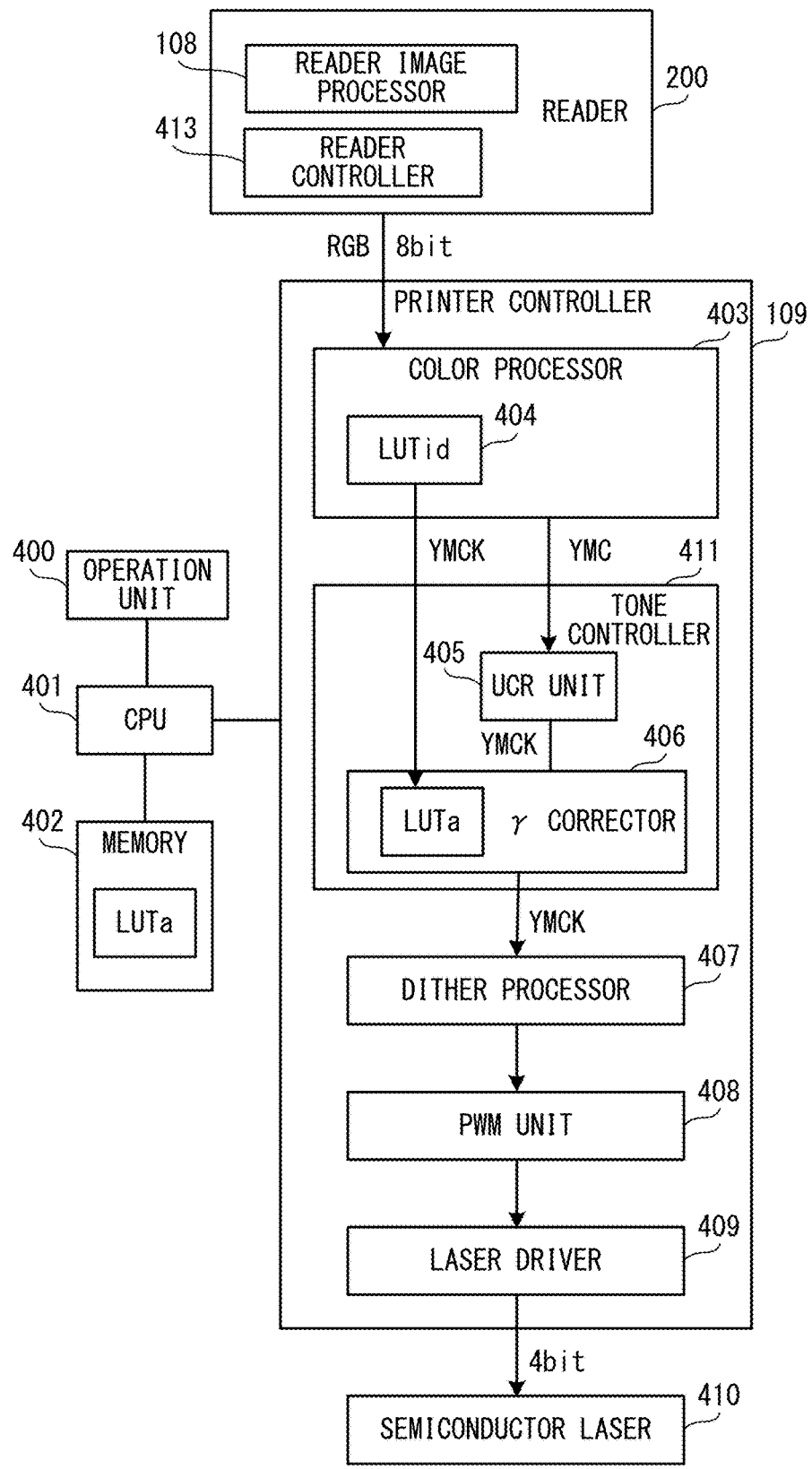
FIG. 4 is an explanatory diagram of a printer controller.

FIG. 4 is an explanatory diagram of the printer controller 109. The following components are connected to the printer controller 109: a central processing unit (CPU) 401 configured to integrally control operations of the image forming apparatus 100; a memory 402; the reader 200; and a semiconductor laser 410. The memory 402 includes a read only memory (ROM) and a random access memory (RAM), and is configured to store a control program for controlling the operations of the image forming apparatus 100 and a variety of pieces of data. The CPU 401 is configured to execute the control program stored in the memory 402, to thereby control the operations of the image forming apparatus 100.

An operation unit 400 is connected to the CPU 401. The operation unit 400 is a user interface including an input device and an output device. The input device includes a touch panel, and key buttons such as a start key, a stop key, and a numeric keypad. The output device includes a display and a speaker. The reader 200 includes a reader controller 413 as well as the reader image processor 108 described above.

The reader controller 413 is configured to control the operation of each component of the reader 200. The semiconductor laser 410 is provided in the exposure device 13, and is configured to emit a laser beam to be applied to the photosensitive drum 11.

The printer controller 109 includes a color processor 403, a tone controller 411, a dither processor 407, a pulse width modulation (PWM) unit 408, and a laser driver 409. The printer controller 109 is configured to convert respective image signals of red (R), green (G), and blue (B) into respective PWM signals of Y (yellow), M (magenta), C (cyan), and K (black), and perform light emission control for the semiconductor laser 410 based on those PWM signals.

The image signals output from the reader image processor 108 of the reader 200 are input to the color processor 403. The color processor 403 performs image processing and color processing on the input image signals so that a desired output result (image) can be obtained when the printer 300 has an ideal output characteristic. The color processor 403 increases the number of tone levels of the image signal to 10 bits from 8 bits in order to improve the accuracy. The color processor 403 includes an LUTid 404 being a look-up table. The LUTid 404 is a luminance-density conversion table for converting luminance information included in the image signal into density information. The color processor 403 uses the LUTid 404 to convert luminance information of the image signals of R, G, and B into density information of the image signals of Y, M, and C. The image signals of Y, M, and C are input to the tone controller 411.

The tone controller 411 corrects tone characteristics of the image signals, which are acquired from the color processor 403, by using correction conditions corresponding to a type of the sheet on which the image is to be formed. For this purpose, the tone controller 411 includes an under color removal (UCR) unit 405 and a y corrector 406 including an LUTa being a lookup table. The tone controller 411 executes tone correction of image signals of Y, M, and C so that the actual density characteristic (tone characteristic) of the printer 300 becomes an ideal density characteristic. The UCR unit 405 regulates the integrated value (total sum) of image signals in respective pixels so that the integrated value is equal to or smaller than a defined value, to thereby limit the total sum of the image signal levels. When the total sum exceeds the defined value, the UCR unit 405 performs under color removal (UCR) processing of replacing a predetermined amount of C, M, and Y image signals into K image signals, to thereby reduce the total sum of the image signal levels.

The y corrector 406 corrects density characteristics (y characteristics) of the image signals by using the LUTa. The LUTa is a 10-bit conversion table (tone correction conditions) for correcting the density characteristics. The tone characteristics of the image to be formed on the sheet by the printer 300 vary depending on an environmental variation and consumption of the components. Moreover, the tone characteristics of the image differ depending on the type of the sheet. The CPU 401 updates the LUTa by executing calibration, and maintains the tone characteristics of the image at predetermined tone characteristics. The printer 300 forms the image on the sheet in accordance with the image signals corrected by the y corrector 406. The memory 402 may hold LUTa for each type of the sheet. The CPU 401 reads out an LUTa corresponding to the type of the sheet, which is designated by the operation unit 400, from the memory 402, and sets the LUTa for the y corrector 406. The LUTa is used at the time of copying the original and forming the image in accordance with a print job from a host computer, but is not used at the time of executing the tone correction calibration. The image signals of Y, M, C, and K after the tone correction are input to the dither processor 407.

The dither processor 407 performs dither processing (halftone processing) on the 10-bit image signals of Y, M, C, and K subjected to tone correction, to thereby convert the 10-bit image signals of Y, M, C, and K into 4-bit signals. The PWM unit 408 performs pulse width modulation on the signals subjected to dither processing to generate the PWM signal corresponding to a drive signal for the exposure device 13. The PWM signal is input to the laser driver 409. The laser driver 409 controls the light emission of the semiconductor laser 410 in accordance with the PWM signal.

<Tone Correction Calibration>

In at least one embodiment, it is possible to adjust two or more types of image forming conditions by calibration using a sheet. In at least one embodiment, description is made of tone correction calibration as a first example of calibration. In the electrophotographic image forming apparatus 100, the tone characteristic (density characteristic) of an image to be formed on a sheet changes due to various causes. For example, the tone characteristic changes due to a change in an environmental condition such as temperature or humidity, or temporal change of a component of the image forming apparatus 100. The image forming apparatus 100 executes calibration for maintaining the tone characteristic. In the calibration, first, the printer 300 forms a test image on the sheet to create a test chart. The image forming apparatus 100 reads the test chart by the document scanner 210, to thereby acquire an image density of the test image. The image forming apparatus 100 creates a correction table so that the acquired image density becomes a target density. The correction table is prepared separately depending on the sheet type (basis weight, as to whether the sheet is coated, and as to whether the sheet is recycled paper).

The tone correction calibration is processing of creating an LUTa. In order to create a test chart for the tone correction, the CPU 401 supplies predetermined image signals (density signals) to a dither processor 407, and forms a test image on the sheet, to thereby create a test chart. The reader 200 reads the test chart, and transmits image signals (luminance signals), which are reading results, to the color processor 403. Through use of the LUTid 404, the color processor 403 converts the luminance signals of red (R), green (G), and blue (B) into density signals of Y, M, C, and K. In this case, a luminance value of B is converted into a density signal value of Y. A luminance value of R is converted into a density signal value of C. A luminance value of G is converted into density signal values of M and K. The LUTid 404 may change the table for use in the conversion depending on the type of the sheet of the test chart. The above-mentioned color processing to be performed by the color processor 403 at the time of the tone correction calibration is processing different from color processing performed when a normal original is read.

Next, the CPU 401 creates the LUTa so that the density signals acquired via the reader 200 is the same as the density signals used to form the test image. The LUTa is created for each color of Y, M, C, and K.

As described above, the reader 200 can read the original image in both of the reading modes which are the ADF reading (first reading mode) and the platen reading (second reading mode). The reader 200 may read the test image printed on the test chart in any one of the ADF reading and the platen reading. The ADF reading may be given priority because a workload of the user is smaller in the ADF reading than in the platen reading.

Figure 5:
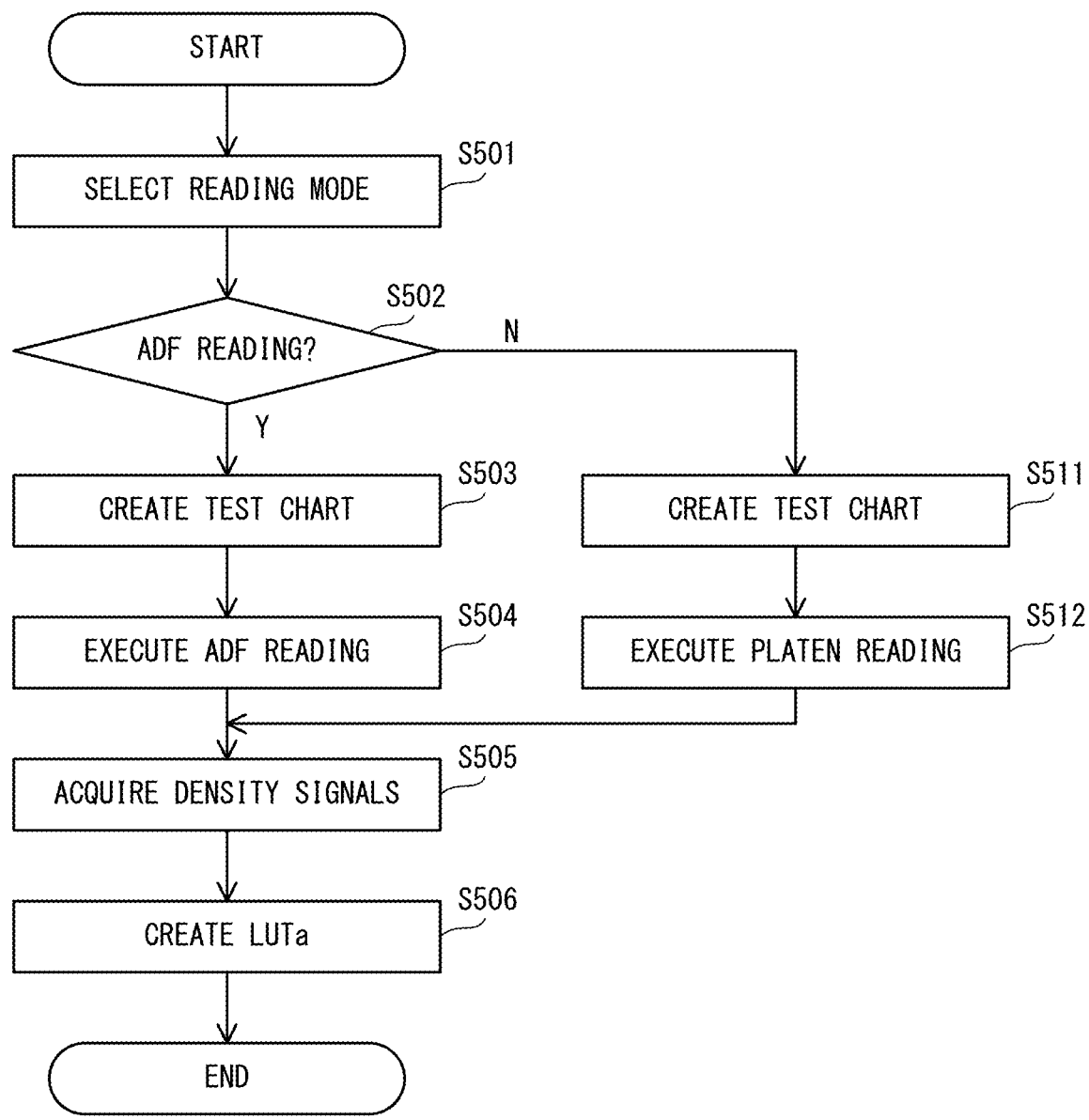
FIG. 5 is a flowchart for illustrating tone correction calibration processing.
Figure 6A:
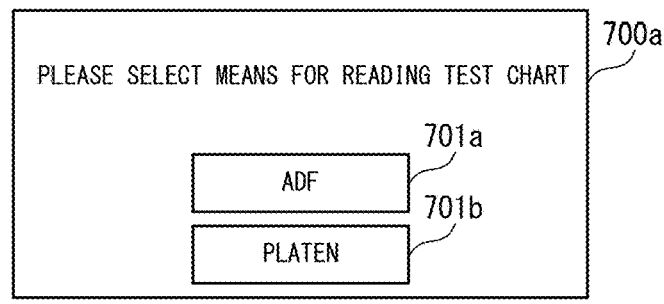
FIG. 6A, FIG. 6B, FIG. 6C, and FIG. 6D are exemplary illustrations of screens to be displayed on a display.
Figure 6B:
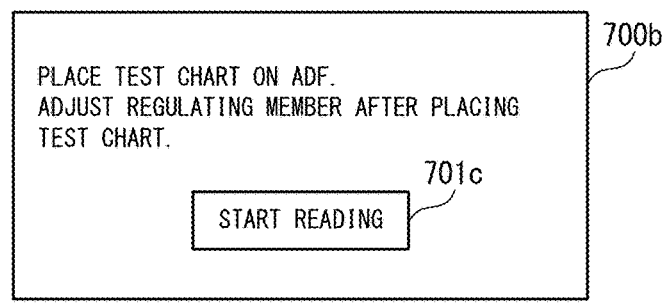
Figure 6C:
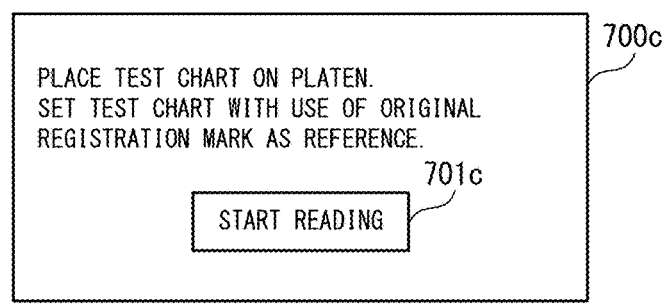
Figure 6D:
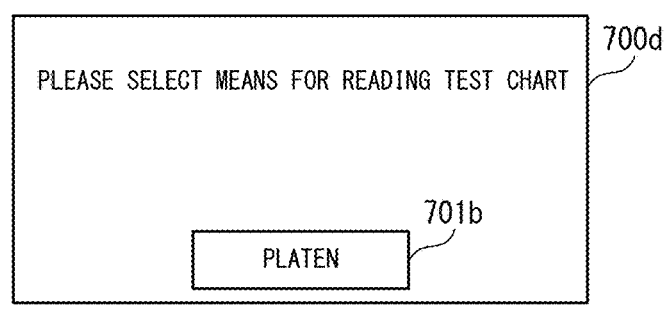
Figure 7:
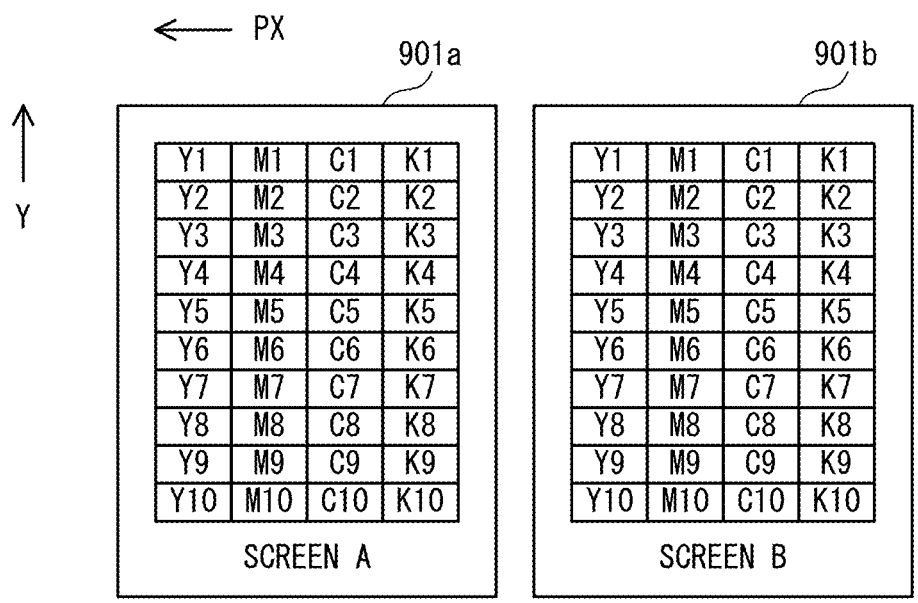
FIG. 7 is an exemplary illustration of test charts.

FIG. 5 is a flowchart for illustrating the tone correction calibration processing. FIG. 6A to FIG. 6D are exemplary illustrations of screens to be displayed on a display of the operation unit 400 during the calibration processing. FIG. 7 is an exemplary illustration of test charts for use in the calibration.

The CPU 401 acquires from the operation unit 400 a signal that indicates which reading mode between the ADF reading and the platen reading is selected by the user (Step S501). When the ADF reading is selected by the user, the CPU 401 operates in the first reading mode. When the platen reading is selected by the user, the CPU 401 operates in the second reading mode. FIG. 6A is an exemplary illustration of an operation screen 700a at the time of selecting the reading mode. The CPU 401 displays the operation screen 700a on the display of the operation unit 400. On the operation screen 700a, a button 701a allowing selection of the ADF reading and a button 701b allowing selection of the platen reading are displayed. The user selects any one of the button 701a and the button 701b through the operation unit 400, to thereby select the reading mode. The CPU 401 acquires from the operation unit 400 the signal indicating the selected reading mode. The CPU 401 determines the selected reading mode (Step S502).

When the ADF reading is selected (Step S502: Y), the CPU 401 sets a first image forming condition for the printer 300, and transmits to the dither processor 407 the density signals of the test image for creating the test chart for the tone correction. Thus, the CPU 401 causes the printer 300 to create the test chart (Step S503). At this time, the LUTa is not used.

As illustrated in FIG. 7, each of test charts 901a and 901b includes test images formed of 10 tones for each color of Y, M, C, and K. For each color, for example, images of 10 tones are formed of density signals of 10%, 20%, 30%, 40%, 50%, 60%, 70%, 80%, 90%, and 100%. The dither processor 407 may be able to apply a plurality of procedures of halftone processing. For example, the dither processor 407 may include a small number-of-line screen (160 lines per inch (lpi) to 180 lpi) and a large number-of-line screen (250 lpi to 300 lpi). The test chart 901a is a test chart to which the small number-of-line screen is applied. The test chart 901b is a test chart to which the large number-of-line screen is applied. The small number-of-line screen is applied to a character and the like, and the large number-of-line screen is applied to a photographic image and the like. When the printer 300 has an ability to form an image with three types or more of the number of lines, the number of test charts may be three or more. In this case, the number of test charts is defined to be one for the sake of convenience.

After creating the test chart, the CPU 401 causes the reader 200 to operate the ADF unit 220, and executes the ADF reading (Step S504). For this purpose, the CPU 401 displays, on the display of the operation unit 400, a message for urging the user to place the test chart on the original tray 302 of the ADF unit 220. FIG. 6B is an exemplary illustration of such a message screen 700b. On the message screen 700b, the message for urging the user to place the test chart on the original tray 302 and a button 701c for issuing an instruction to start the reading are displayed.

After placing the test chart on the original tray 302, the user presses the button 701c through the operation unit 400, to thereby issue an instruction to start the ADF reading. Thus, the CPU 401 acquires from the operation unit 400 such an instruction to start the reading in the ADF reading. When acquiring the instruction to start the reading, the CPU 401 instructs the reader 200 to perform the ADF reading. The reader 200 conveys the test chart by the ADF unit 220, and reads the test chart by the document scanner 210. The reader image processor 108 of the document scanner 210 transmits a luminance signal, which indicates a reading result of the test chart, to the printer controller 109.

When the platen reading is selected (Step S502: N), the CPU 401 sets a second image forming condition for the printer 300, and transmits to the dither processor 407 the density signals of the test image for creating the test chart for the tone correction. Thus, the CPU 401 causes the printer 300 to create the test chart (Step S511). At this time, the LUTa is not used. Examples of the test images of the test charts are illustrated in FIG. 7, and are the same as those in the case of the ADF reading.

After creating the test chart, the CPU 401 executes the platen reading by the reader 200 (Step S512). For this purpose, the CPU 401 displays, on the display of the operation unit 400, a message for urging the user to place the test chart on the platen 102. FIG. 6C is an exemplary illustration of such a message screen 700c. On the message screen 700c, the message for urging the user to place the test chart on the platen 102 and the button 701c for issuing an instruction to start the reading are displayed.

The user opens the ADF unit 220 to expose the platen 102, and places on the platen 102 the test chart with a surface on which the test screen is formed directed to the platen 102. The user then presses the button 701c through the operation unit 400, to thereby issue an instruction to start the platen reading. Thus, the CPU 401 acquires from the operation unit 400 such an instruction to start the reading in the platen reading. When acquiring the instruction to start the reading, the CPU 401 instructs the reader 200 to perform the platen reading. The reader 200 reads the test chart on the platen 102 by the document scanner 210. The reader image processor 108 of the document scanner 210 transmits a luminance signal, which indicates a reading result of the test chart, to the printer controller 109.

When the test chart is read by the processing of Step S504 or Step S512, the CPU 401 acquires the density signals of the test image based on the reading result (luminance signals) (Step S505). The CPU 401 converts the luminance signals into the density signals by using the LUTid 404 of the color processor 403. Thus, a density signal for each of the images of 10 tones is obtained. The CPU 401 may switch the tables of the LUTid 404 of the color processor 403 depending on the type of the sheet for use in the test chart.

The CPU 401 creates the LUTa based on the density signals used to create the test image and the density signals obtained from the reading result of the test chart (Step S506). The CPU 401 stores the created LUTa in the memory 402. The tone correction calibration processing is performed as described above when the test image is formed on the single sheet and the test chart is single.

<Printing Position Adjustment Calibration>

Now, description is made of printing position adjustment calibration as a second example of calibration. The printing position adjustment calibration is executed to adjust a deviation amount of the geometric characteristic (including printing position and perpendicularity of image) of an image to be formed on a sheet. The deviation amount of the geometric characteristic depends on the type of a sheet on which an image is to be formed, particularly, a physical characteristic of the sheet. Thus, the geometric characteristic is required to be adjusted depending on the sheet type.

The types (physical characteristics) of sheets to be used for printing by the printer 300 are managed by the CPU 401 through use of a sheet management table. FIG. 8 is an exemplary illustration of the sheet management table. Sheets to be managed through use of a sheet management table 500 include, for example, a generally used sheet, a commercially available sheet that is already evaluated by a printer manufacturer, and a sheet registered by a user through the operation unit 400. The sheet management table 500 is stored into the memory 402 in file formats of an extensible markup language (XML) or comma-separated values (CSV), for example. The sheet management table 500 can be read, written, or updated appropriately.

The sheet management table 500 registers attribute data for each sheet type. The sheet type is identified by a sheet name 511. The attribute data stores, as physical characteristics of a sheet, a width 512 (sheet length in sub-scanning direction) of the sheet, a length 513 (sheet length in main-scanning direction) of the sheet, a basis weight 514 of the sheet, a surface property 515 of the sheet, a color 516 of the sheet, and information 517 indicating whether the sheet is a preprinted sheet. The surface property 515 of the sheet indicates the physical characteristic of the sheet surface, such as "plain paper", "coated" indicating the coated surface for improving glossiness, and "embossed" indicating irregularities formed on the surface. The information 517 indicating whether the sheet is a preprinted sheet indicates whether a sheet to be used for printing is a sheet (preprinted sheet) on which a ruled line or frame, for example, is printed in advance.

The sheet management table 500 registers, for each type of sheet identified by the sheet name 511, a deviation amount 520 of the geometric characteristic of an image formed on the front surface, and a deviation amount 521 of the geometric characteristic of an image formed on the back surface. The printer 300 adjusts the deviation at the time of execution of printing so that an image having an ideal geometric characteristic (perpendicularity or printing position) is printed on a sheet. The deviation amount 520 of the geometric characteristic of an image formed on the front surface of the sheet is information indicating an amount of deviation from an ideal printing position on the front surface of the sheet. The deviation amount 521 of the geometric characteristic of an image formed on the back surface of the sheet is information indicating an amount of deviation from an ideal printing position on the back surface of the sheet. In at least one embodiment, the deviation amounts 520 and 521 are each represented by "lead position", "side position", "main-scanning magnification", and "sub-scanning magnification".

The deviation amount of "lead position" indicates a positional deviation amount of a position at which an image is formed in the sub-scanning direction at the time of forming the image with respect to the sheet. The lead position is a position at which an image is started to be formed with the top of a conveying direction of the sheet serving as a starting position. An initial value of the deviation amount of the lead position is "0". The deviation amount of "side position" indicates a positional deviation amount of a position at which an image is formed in the main-scanning direction at the time of forming the image with respect to the sheet. The side position is a position at which an image is started to be formed with the sheet end portion on the left side of the conveying direction of the sheet serving as a starting position. An initial value of the deviation amount of the side position is "0". Respective deviation amounts of the lead position and the side position are adjusted by controlling the timing of the exposure device 13 starting to radiate laser light to the photosensitive drum 11, for example.

The deviation amount of "sub-scanning magnification" indicates a deviation (magnification with respect to ideal length) in image length in the sub-scanning direction at the time of forming an image. The deviation amount of the sub-scanning magnification is adjusted by controlling the rotation speed (drive speed) of the intermediate transfer belt 31, for example. The deviation amount of "main-scanning magnification" indicates a deviation (magnification with respect to ideal length) in image length in the main-scanning direction at the time of forming an image. The deviation amount of the main-scanning magnification is adjusted by controlling the clock frequency of laser light when the exposure device 13 modulates the laser light based on an image signal, for example. An initial value of the deviation amount of each of the sub-scanning magnification and the main-scanning magnification is "0".

Those deviation amounts 520 and 521 are calculated by the reader 200 reading a test chart (adjustment chart) on which a predetermined mark is printed as a test image and detecting a position of the mark on the adjustment chart based on the reading result. Details of the adjustment chart are described later.

Adjustment of the deviation amounts 520 and 521 of the physical characteristics is not limited to control of the timing of radiating a laser light, the drive speed of the intermediate transfer belt 31, and the clock frequency of the laser light. For example, an image itself to be printed on a sheet may be shifted by a predetermined amount to adjust the deviation of the printing position. The user may freely specify a shift amount of the image to be printed on a sheet at the time of adjusting the deviation amount of the printing position. Alternatively, the printer controller 109 may perform affine transformation to adjust the geometric characteristic of the image to be printed on a sheet. In this configuration, the printer controller 109 generates image data in a bitmap format from an input image signal, subjects the image data to affine transformation, and transfers the transformed image data to the color processor 403. Image processing to be subjected to image data input to the color processor 403 has already been described, and thus description thereof is omitted here.

The CPU 401 can edit the sheet management table 500 by, for example, new registration or update of attribute data registered in advance through operation of the user using the operation unit 400. FIG. 9A and FIG. 9B are exemplary diagrams of an edit screen to be displayed on the display of the operation unit 400 at the time of editing the sheet management table 500.

An edit screen 1100 of FIG. 9A is a screen for editing attribute data on a sheet registered in the sheet management table 500 or additionally registering a new sheet in the sheet management table 500.

The sheet selected by the user on the edit screen 1100 is highlighted. In the example of FIG. 9A, a sheet of "XYZ paper, color 81" is selected and highlighted. The user can press a button 1101 on the edit screen 1100 to additionally register a new sheet in the sheet management table 500. The user can press a button 1102 on the edit screen 1100 to edit attribute data on the selected sheet (highlighted sheet). The user presses the button 1101 or the button 1102 to switch to the display of an edit screen 1110 of FIG. 9B.

The user can input attribute data on the edit screen 1110. The attribute data is, for example, a sheet name, a width (sheet length in sub-scanning direction), a length (sheet length in main-scanning direction), a basis weight, a surface property, a color, and a preprinted sheet. The surface property is selected from a list of surface properties that can be supported by the printer 300. Further, the color is selected from a list of colors registered in advance. A button 1111 on the edit screen 1110 is pressed after each piece of attribute data is input, which establishes the data (sheet attribute data) input at this time to be registered into the sheet management table 500. Further, the button 1111 is pressed to switch to the display of the edit screen 1100 of FIG. 9A.

A button 1103 on the edit screen 1100 is pressed, to thereby enable execution of a series of procedures of processing for adjusting the printing position for the selected sheet (highlighted sheet). Details of the series of procedures of processing for adjusting the printing position are described later.

Figure 10:
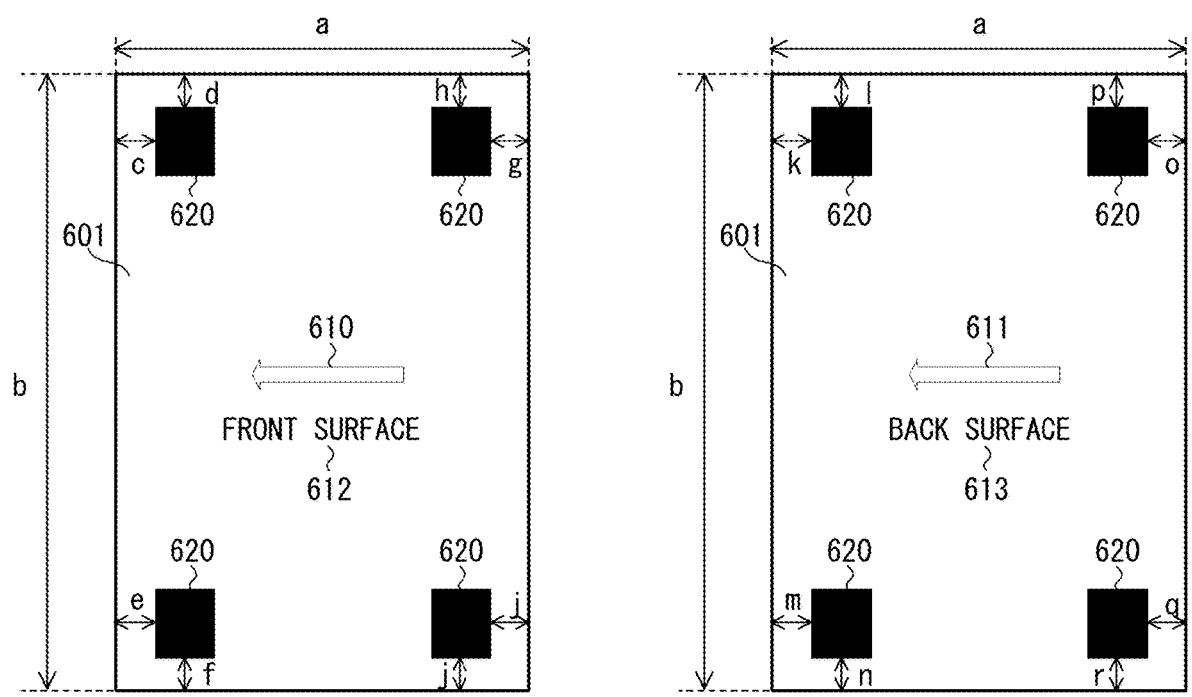
FIG. 10 is an explanatory diagram of an adjustment chart.

FIG. 10 is an explanatory diagram of the adjustment chart. Image data on the adjustment chart 601 is stored in the memory 402. The CPU 401 reads out the image data on the adjustment chart 601 from the memory 402 at the time of printing the adjustment chart 601, and transfers the image data to the printer controller 109.

The adjustment chart 601 is constructed by forming marks 620 at predetermined positions of the front and back surfaces of the sheet. In at least one embodiment, a total of eight marks 620 are formed at four corners of both surfaces of the adjustment chart 601. The mark 620 is formed by a color having a larger difference in reflectivity from the color of the sheet. For example, the black mark 620 is formed on a white sheet.

An image 610 for identifying the conveying direction at the time of reading and an image 612 for identifying the front and back surfaces are printed on the front surface of the adjustment chart 601. An image 611 for identifying the conveying direction at the time of reading and an image 613 for identifying the front and back surfaces are printed on the back surface of the adjustment chart 601. That is, when images of both surfaces are positioned, the image 610 and the image 612 are printed on the front surface of the adjustment chart 601, and the image 611 and the image 613 are printed on the back surface of the adjustment chart 601. When an image of one surface is positioned, the image 610 and the image 612 are printed on the front surface of the adjustment chart 601.

The images 610 and 611 for identifying the conveying direction of the adjustment chart 601 are only required to be printed when the adjustment chart 601 is read by the ADF reading, and are not required to be printed when the adjustment chart 601 is read by the fixed reading. As illustrated in FIG. 10, the images 610 and 611 are arrows that enable the user to identify the conveying direction of the adjustment chart 601. The images 612 and 613 are characters that enable the user to identify the front and back surfaces of the adjustment chart 601.

When the mark 620 is formed at an ideal position, the mark 620 is formed at a position a predetermined distance away from the sheet end portion of the adjustment chart 601. The deviation amount of the geometric characteristic of an image formed on the front surface of a sheet is detected by measuring the position of the mark 620 printed on the front surface of the adjustment chart 601. The deviation amount of the geometric characteristic of an image formed on the back surface of a sheet is detected by measuring the position of the mark 620 printed on the back surface of the adjustment chart 601. The deviation amount of the printing position on the back surface with respect to the printing position on the front surface or the deviation amount of the printing position on the front surface with respect to the printing position on the back surface is detected by measuring the relative positions of respective marks 620 printed on both surfaces of the adjustment chart 601.

When the printing position is adjusted by using the adjustment chart 601, distances "a" to "j" of the front surface and distances "k" to "r" of the back surface are measured to measure the positions of the marks 620. The distance "a" is a length of the adjustment chart 601 in the sub-scanning direction. The distance "b" is a length of the adjustment chart 601 in the main-scanning direction. The ideal length of the distance "a" is the width 512 of the sheet registered in the sheet management table 500. The ideal length of the distance "b" is the length 513 of the sheet registered in the sheet management table 500. The distances "c" to "r" are each a length from the mark 620 to the closest end portion of the adjustment chart 601.

A method of measuring the distances "a" to "r" includes a manual measurement method and an automatic measurement method. In the manual measurement method, the user sets a ruler on the adjustment chart 601 to measure the lengths of the distances "a" to "r". The user inputs the measured length by using the operation unit 400. In the automatic calculation method, the adjustment chart 601 is read (scanned) by the reader 200. The CPU 401 analyzes the results of reading the adjustment chart 601 to detect a difference in density for each pixel of the read image. The CPU 401 detects the end portion of the adjustment chart 601 and an edge (namely, boundary between background of adjustment chart 601 and mark 620) of the mark 620 based on the difference in density. The CPU 401 calculates the distances "a" to "r" based on the detected end portion of the adjustment chart 601 and the detected edge of the mark 620. Details of the processing of analyzing the adjustment chart 601 are described later.

FIG. 11 is an explanatory table of a method of detecting the deviation amount of the printing position based on the measured distances "a" to "r". In at least one embodiment, a calculation table 1300 is used for detecting the deviation amount of the printing position. The calculation table 1300 is stored in the memory 402. The CPU 401 calculates the deviation amount of the printing position based on the calculation table 1300.

The calculation table 1300 defines a measurement value 1310, an ideal value 1311, and a deviation amount 1312 of the printing position for each of "lead position", "side position", "main-scanning magnification", and "sub-scanning magnification" of the front and back surfaces of the adjustment chart 601. The deviation amount 1312 of the printing position is represented by a conversion expression using the measurement value 1310 and the ideal value 1311.

The measurement value 1310 of "lead position" on the front surface of the adjustment chart 601 is calculated based on actually measured values of the distances "c" and "e" of FIG. 10 by using a conversion expression shown in the calculation table 1300. The lead position is an average value of distances from the end portion of the adjustment chart 601, which is at the top in the conveying direction of the sheet, to the corresponding mark 620.

The measurement value 1310 of "side position" on the front surface of the adjustment chart 601 is calculated based on actually measured values of the distances "f" and "j" of FIG. 10 by using a conversion expression shown in the calculation table 1300. The side position is an average value of distances from the end portion of the adjustment chart 601, which is on the left side in the conveying direction of the sheet, to the corresponding mark 620.

As shown in the calculation table 1300, the ideal values 1311 of "lead position" and "side position" are each 1 cm. That is, the mark 620 is ideally printed at a position away from the end portion of the corresponding adjustment chart 601 by 1 cm.

The measured value 1310 of "main-scanning magnification" of the front surface of the adjustment chart 601 is calculated based on the actually measured values of the distances "b", "d", "f", "h", and "j" of FIG. 10 by using a conversion expression shown in the calculation table 1300. The main-scanning magnification is an average value of distances between marks 620 arranged on the same scanning line in the main-scanning direction.

The measured value 1310 of "sub-scanning magnification" of the front surface of the adjustment chart 601 is calculated based on the actually measured values of the distances "a", "c", "e", "g", and "i" of FIG. 10 by using a conversion expression shown in the calculation table 1300. The sub-scanning magnification is an average value of distances between marks 620 arranged on the same scanning line in the sub-scanning direction.

As shown in the calculation table 1300, the ideal value 1311 of "main-scanning magnification" is a value obtained by subtracting 2 cm from the width 512 of the sheet in the main-scanning direction of each sheet registered in the sheet management table 500. Similarly, the ideal value 1311 of "sub-scanning magnification" is a value obtained by subtracting 2 cm from the width 512 of the sheet in the sub-scanning direction of each sheet registered in the sheet management table 500.

The deviation amount 1312 of the printing position on the back surface of the adjustment chart 601 is also calculated by a conversion expression similar to that of the front surface.

As shown in the calculation table 1300, the deviation amount 1312 of each printing position for "lead position", "side position", "main-scanning magnification", and "sub-scanning magnification" is calculated by using the corresponding measured value 1310 and ideal value 1311. The deviation amount 1312 of the printing position for "lead position" and "side position" is calculated by subtracting the ideal value 1311 from the measured value 1310 (in units of mm). The deviation amount 1312 of the printing position for "main-scanning magnification" and "sub-scanning magnification" is calculated by subtracting the ideal value 1311 from the measured value 1310 and dividing the obtained value by the ideal value 1311 (in units of %). The deviation amount 1312 of the printing position calculated in this manner is registered into the sheet management table 500 as sheet attribute data.

FIG. 12A and FIG. 12B are explanatory diagrams of processing of analyzing the adjustment chart 601 (FIG. 10). The CPU 401 detects an image end portion of the adjustment chart 601 and an image end portion of the mark 620 based on a read image 800 representing read data on the adjustment chart 601 (FIG. 10). The adjustment chart 601 is read by the fixed reading. At this time, the adjustment chart is covered by a backing sheet with a dark image from the above, and is placed on the platen 102. Similarly, when the adjustment chart 601 is read by the ADF reading, an adjustment chart (not shown) on which a black mark is formed so as to be in contact with a part of the end portion of the adjustment chart 601 is read instead of a backing sheet.

FIG. 12A represents the read image 800 obtained as a result of reading the adjustment chart 601 by the fixed reading. The read image 800 is a part of an image obtained by reading the adjustment chart 601. A region 801 is an image region of the backing sheet included in the read image 800. A region 802 is an image region of a background of the adjustment chart 601 included in the read image 800. A region 803 is an image region of the mark 620 of the adjustment chart 601 included in the read image 800. An end portion 810 is an end portion (namely, image end of adjustment chart 601) of the region 802. An end portion 812 is an end portion (namely, image end of mark 620) of the region 803.

An analysis range 811 is a range (namely, focused range of analysis processing) of analyzing the read image 800. The read image 800 is analyzed by measuring the density change from the image end in each of the main-scanning direction and sub-scanning direction in units of pixels. The CPU 401 detects the region 801, the region 802, the region 803, the end portion 810, and the end portion 812 based on the measurement result. The measurement unit may be a unit that is smaller or larger than the pixel unit. The reading interval may be fixed or thinned out.

FIG. 12B is an explanatory diagram of processing of analyzing the read image 800 in the analysis range 811. The density of the read image 800 in the analysis range 811 is detected from the image end of the read image 800.

First, the CPU 401 detects an image density of the region 801 (section (A)). Next, the CPU 401 detects an image density of the region 802 (section (B)) between the region 801 and the region 803. Next, the CPU 401 detects an image density of the region 803 (section (C)) between the region 802 and the region 802. Next, the CPU 401 detects an image density of the region 802 (section (D)) between the region 803 and the region 803. Next, the CPU 401 detects an image density of the region 803 (section (E)) between the region 802 and the region 802. Next, the CPU 401 detects an image density of the region 802 (section (F)) between the region 803 and the region 801. Next, the CPU 401 detects an image density of the region 801 (section (G)).

The CPU 401 uses those detection results to calculate a range of the image printed on the adjustment chart 601 based on the measurement positions of respective sections (A) to (G) of the read image 800. Further, the CPU 401 determines that the region 803 in each of the section (C) and the section (E) is due to the density of the mark 620 printed on the adjustment chart 601. Further, the CPU 401 determines that the region 801 in each of the section (A) and the section (G) is due to the density of the backing sheet.

Further, the CPU 401 uses the detection results to detect a position at which the image density switches between the section (A) and the section (B) as the end portion 810 (namely, image end (left end) of adjustment chart 601). Further, the CPU 401 detects a position at which the image density switches between the section (B) and the section (C) as the end portion 812 (namely, image end (left end) of left mark 620). Further, the CPU 401 detects a position at which the image density switches between the section (C) and the section (D) as the end portion 812 (namely, image end (right end) of left mark 620). Further, the CPU 401 detects a position at which the image density switches between the section (D) and the section (E) as the end portion 812 (namely, image end (left end) of right mark 620). Further, the CPU 401 detects a position at which the image density switches between the section (E) and the section (F) as the end portion 812 (namely, image end (right end) of right mark 620). Further, the CPU 401 detects a position at which the image density switches between the section (F) and the section (G) as the end portion 810 (namely, image end (right end) of adjustment chart 601).

The CPU 401 uses those detection results to calculate a distance between the image end (left end) of the adjustment chart 601 and the image end (left end) of the left mark 620 as the distance "c" of the adjustment chart 601. Further, the CPU 401 calculates a distance between the image end (right end) of the right mark 620 and the image end (right end) of the adjustment chart 601 as the distance "g" of the adjustment chart 601. Further, the CPU 401 calculates a distance between the image end (left end) of the adjustment chart 601 and the image end (right end) of the adjustment chart 601 as the distance "a" of the adjustment chart 601.

The distances "e" and "i", the distances "d" and "f", and the distances "h" and "j" of the adjustment chart 601 are also calculated similarly to the method of calculating the distances "c" and "g" of the adjustment chart 601. Further, the distance "b" of the adjustment chart 601 is also calculated similarly to the method of calculating the distance "a" of the adjustment chart 601.

In this manner, the CPU 401 can automatically calculate the distances "a" to "r" of the adjustment chart 601 based on the result of detecting the image end of the adjustment chart 601 and the image end of the mark 620.

In calibration using sheets (test charts 901a and 901b and adjustment chart 601) of at least one embodiment, details of processing at the time of reading a sheet while conveying the sheet by using the ADF unit 220 are optimized depending on the calibration type. Now, description is made of a case of changing the details of processing between printing position adjustment calibration and tone correction calibration.

<Change of Details of Processing>

A detection target differs depending on the calibration type.

In tone correction calibration, the detection target is image densities of the test charts 901a and 901b including test images of from a low density to a high density as illustrated in FIG. 7. In order to ensure an accuracy required for tone correction calibration, it is required to accurately detect an image density of each test image of from a low density to a high density. Further, in order to adjust the tone, it is required to accurately detect an image density of each test image of from a low density to a high density.

In printing position adjustment calibration, the detection target is the position of the mark 620 of the adjustment chart 601 as illustrated in FIG. 10. The position of the mark is detected based on whether there is an image formed with a high density. In order to ensure an accuracy required for printing position adjustment calibration, whether there is a high density image is only required to be accurately determined, and it is not required to accurately detect an image density.

The reading mode is determined based on the types of calibration and sheet. FIG. 13 is an explanatory table of a relationship among the calibration type, the sheet type, and the reading mode. The sheet type distinguishes between types of sheet depending on the physical characteristic, and is determined by the basis weight, for example. For example, the basis weight range of the first sheet type is 38 $g/m^2$ or less, the basis weight range of the second sheet type is from 39 $g/m^2$ to 59 $g/m^2$, the basis weight range of the third sheet type is from 60 $g/m^2$ to 220 $g/m^2$, and the basis weight range of the fourth sheet type is 221 $g/m^2$ or more. There is no sheet type that is not adapted to the platen reading. This is because a sheet is not conveyed and remains stationary with respect to the platen for scanning in the platen reading.

The sheets of the first sheet type and fourth sheet type are not conveyed by the ADF unit 220 satisfactorily. The ADF unit 220 has a poor conveyance capability and a jam is liable to occur through conveyance when the basis weight is too small or too large. Thus, a sheet range (basis weight range) that ensures the conveyance capability is limited. Therefore, both the printing position adjustment calibration and the tone correction calibration do not support ADF reading of sheets of the first sheet type and fourth sheet type, and supports only the platen reading thereof.

The sheets of the second sheet type and third sheet type are conveyed by the ADF unit 220 satisfactorily. The sheet of the third sheet type enables detection of a low-density test image to a high-density test image, and can ensure an accuracy required for tone correction calibration. Thus, tone correction calibration supports the ADF reading of a sheet of the third sheet type. Printing position adjustment calibration also supports the ADF reading of a sheet of the third sheet type.

The sheet of the second sheet type enables detection of the position of the mark 620. Thus, printing position adjustment calibration supports the ADF reading of a sheet of the second sheet type. However, the sheet of the second sheet type does not enable detection of a low-density test image. Thus, tone correction calibration does not support the ADF reading of a sheet of the second sheet type. In this manner, printing position adjustment calibration supports the ADF reading of a sheet of the second sheet type, whereas tone correction calibration does not support the ADF reading of a sheet of the second sheet type.

<Influence of Basis Weight on Detection Accuracy>

Figure 14:
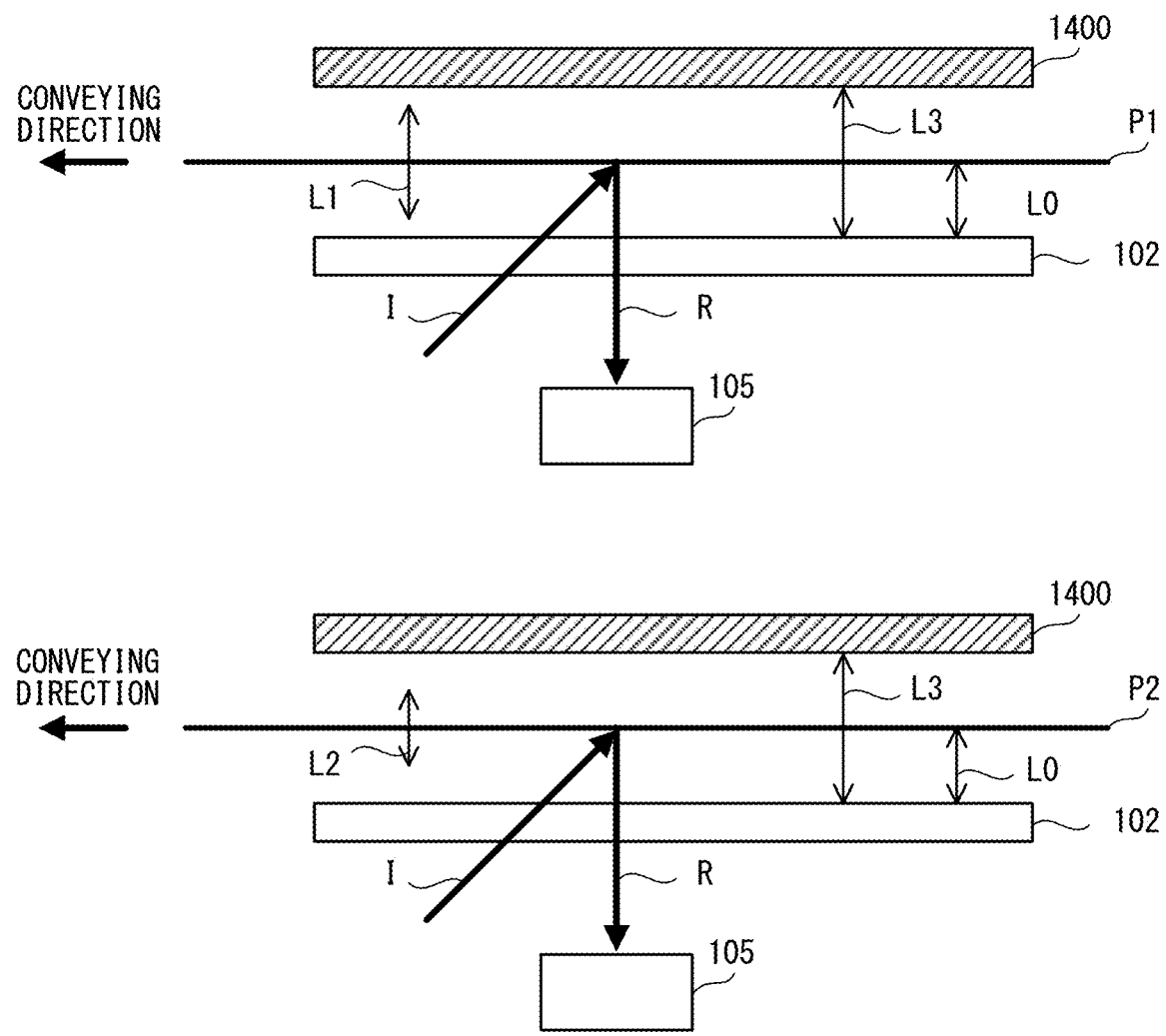
FIG. 14 is an explanatory diagram of an influence of a basis weight of a sheet on a detection accuracy.

FIG. 14 is an explanatory diagram of an influence of a basis weight of the sheet on the detection accuracy at a time when the test charts 901a and 901b or the adjustment chart 601 is read by the ADF reading. The image sensor 105 of the document scanner 210 receives a diffusely reflected light R, which is reflection by the sheet P (original) of an incident light I emitted from the original illumination lamp 103. The original is read with a higher detection accuracy as the original becomes closer to a stopped state. Even when the original is read during conveyance, the original is conveyed so that the read surface has a fixed distance L0 from the platen 102.

However, the distance between the sheet P and the platen 102 varies due to fluttering during conveyance and the degree of bending of the sheet. The amount of variation in distance between the sheet P and the platen 102 differs depending on the basis weight of the sheet. In FIG. 14, regarding the sheet P2 having a relatively large basis weight, the distance L has a small variation amount of L0±L2 mm, whereas regarding the sheet P1 having a relatively small basis weight, the distance L has a large variation amount of L0±L1 mm (L1>L2). This is because, as the basis weight becomes larger, fluttering during conveyance and the degree of bending of the sheet become smaller due to a high rigidity.

The image sensor 105 is designed to have an appropriate focal length under a state in which the sheet P is in contact with the platen 102. Thus, the accuracy of detection by the image sensor 105 decreases as the sheet P becomes away from the platen 102. A distance L3 between the platen 102 and a back surface material 1400 in at least one embodiment is 0.5 mm at the reading position.

From the description given above, the sheet P2 having a relatively large basis weight ensures the accuracy of detecting the mark position, and thus is appropriate for usage in printing position adjustment calibration. However, the sheet P2 having a relatively large basis weight does not ensure the accuracy of detecting test images of from a low density to a high density, and thus is not appropriate for usage in tone correction calibration. The sheet P1 having a relatively small basis weight ensures the accuracy of detecting the mark position and the accuracy of detecting the test images of from a low density to a high density, and thus is appropriate for usage in both of printing position adjustment calibration and tone correction calibration.

Figure 15A:
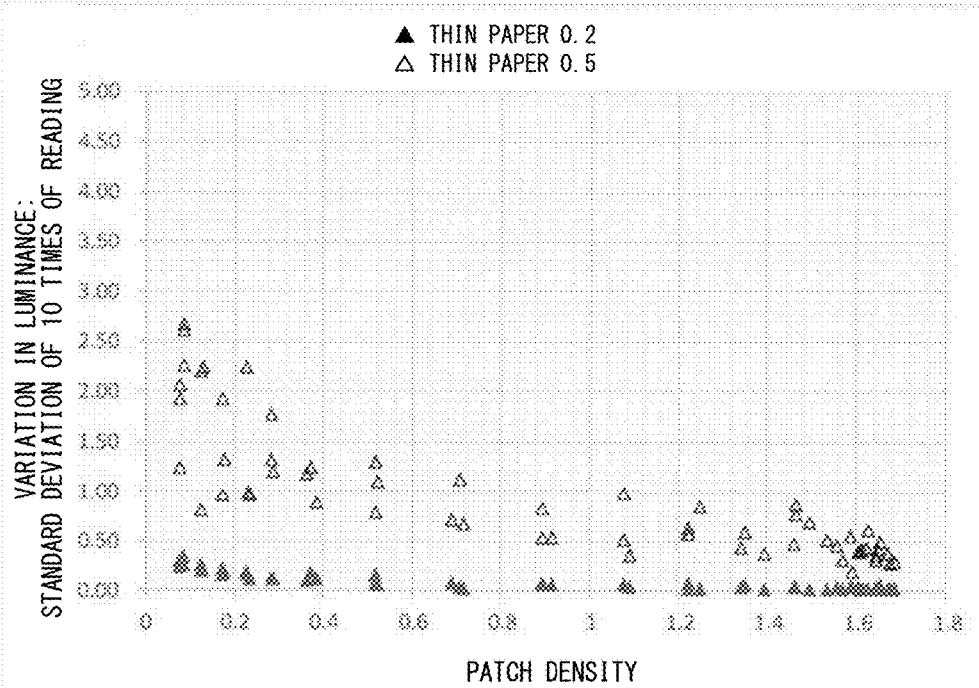
FIG. 15A and FIG. 15B are explanatory graphs of measurement accuracies of respective sheet types at a time of ADF reading.
Figure 15B:
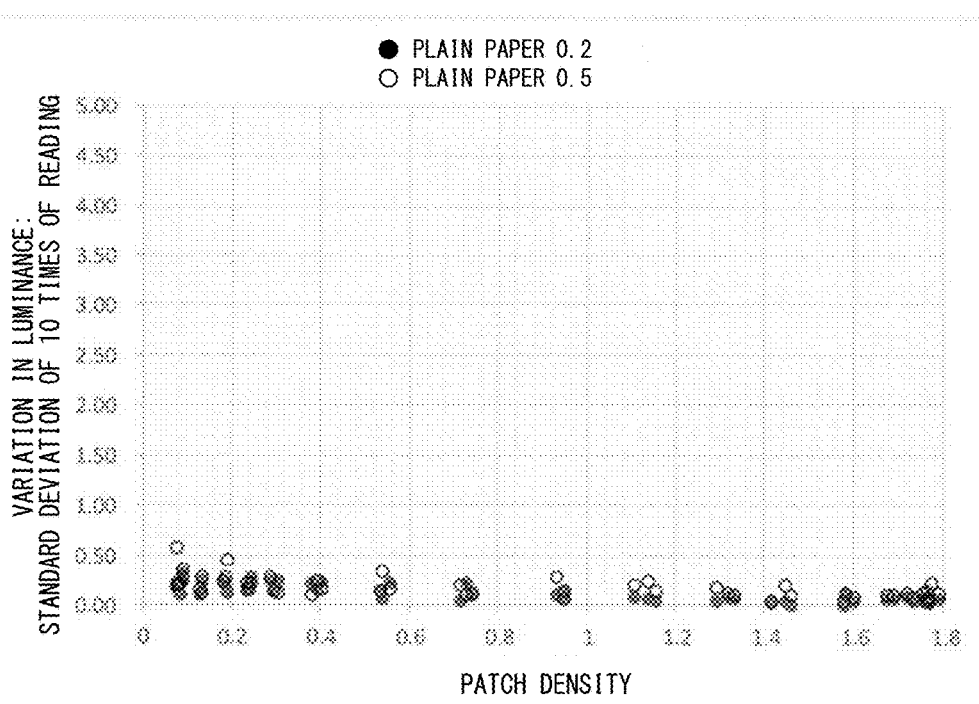

FIG. 15A and FIG. 15B are explanatory graphs of measurement accuracies of respective types of sheet at the time of the ADF reading. Those graphs represent the fact that only the sheet of the third sheet type ensures a measurement accuracy required for tone correction calibration.

FIG. 15A represents a variation in reading of the image density (patch density) at a time when thin paper of the second type of sheet on which patch images of different densities are formed are subjected to ADF reading. In FIG. 15A, the reading variations in a case where the distance L3 between the platen 102 and the back surface material 1400 is 0.2 mm and 0.5 mm are shown. In FIG. 15A, the horizontal axis represents a patch density, and the vertical axis represents a standard deviation of 8-bit luminance values (0 to 255) at the time of 10 times of ADF reading. A larger standard deviation represents a lower measurement accuracy. It is understood that, regarding thin paper, when the distance L3 between the platen 102 and the back surface material 1400 is 0.5 mm, there is a large decrease in measurement accuracy, compared to a case in which the distance L3 between the platen 102 and the back surface material 1400 is 0.2 mm.

FIG. 15B represents a variation in reading of the image density (patch density) at a time when plain paper of the third type of sheet on which patch images of different densities are formed are subjected to ADF reading. In FIG. 15B, reading variations in a case where the distance L3 between the platen 102 and the back surface material 1400 is 0.2 mm and 0.5 mm are shown. It is understood that, compared to the thin paper shown in FIG. 15A, the plain paper has a small difference in measurement accuracy between the case in which the distance L3 between the platen 102 and the back surface material 1400 is 0.2 mm and the case in which the distance L3 between the platen 102 and the back surface material 1400 is 0.5 mm. This is because the amount of variation in distance between the sheet and the platen 102 differs depending on the sheet type as described with reference to FIG. 14.

However, as the distance L3 between the platen 102 and the back surface material 1400 becomes smaller, the number of types of sheets that can be conveyed by the ADF unit 220 becomes smaller, resulting in decrease of basic performance of the ADF unit 220. Thus, reduction of the distance L3 between the platen 102 and the back surface material 1400 does not serve as a solution. In general, the distance L3 between the platen 102 and the back surface material 1400 is 0.5 mm, and is set to 0.5 mm also in at least one embodiment.

Figure 16:
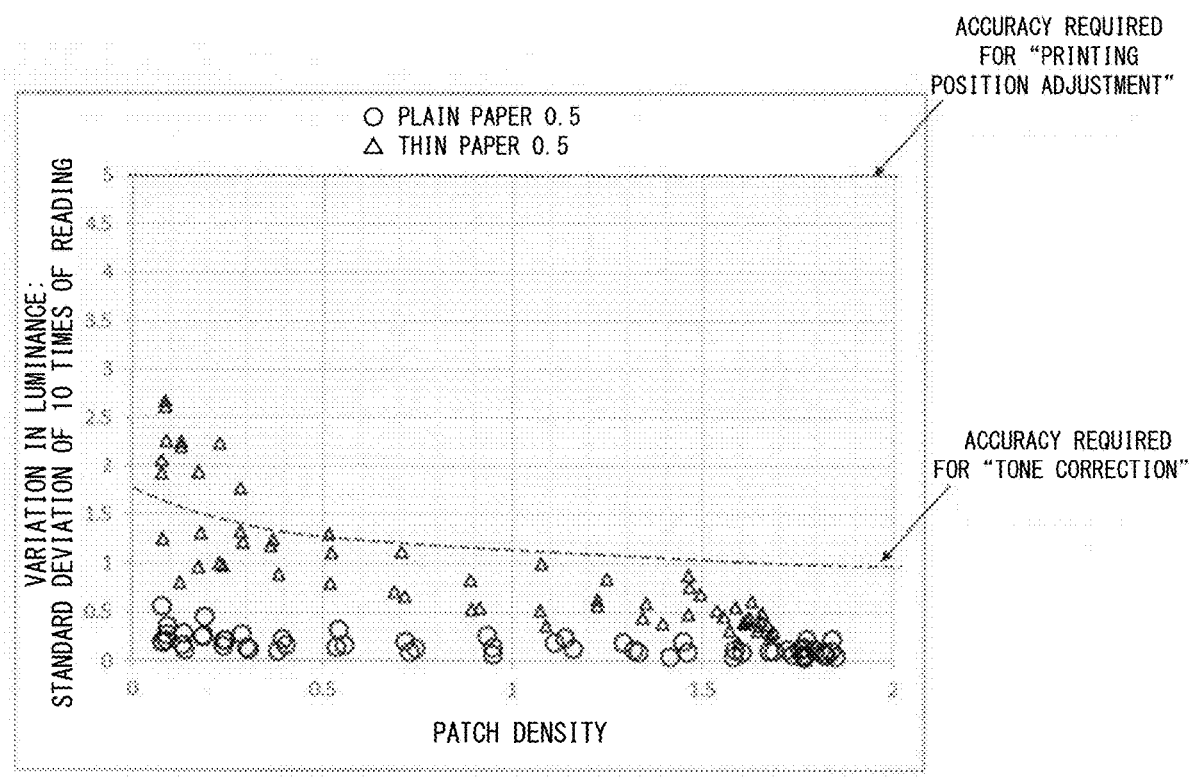
FIG. 16 is a graph for comparing measurement accuracies of thin paper and plain paper.

FIG. 16 is a graph for comparing measurement accuracies of thin paper and plain paper. The distance L3 between the platen 102 and the back surface material 1400 is 0.5 mm. The broken line indicates an accuracy required for tone correction calibration. The dotted line indicates an accuracy required for printing position adjustment calibration. In tone correction calibration, accurate measurement of test images of from a low density to a high density is required in order to adjust tone. In printing position adjustment calibration, it suffices that whether there is a mark can be determined, and thus a smaller level of measurement accuracy is required compared to tone correction calibration.

On the basis of FIG. 16, it is understood that plain paper ensures an accuracy required for tone correction calibration and printing position adjustment calibration. Thin paper does not ensure the accuracy required for tone correction calibration in a low-density region, and ensures the accuracy required for printing position adjustment calibration.

<Processing of Changing Sheet Type at Time of ADF Reading Depending on Type of Calibration>

Figure 17:
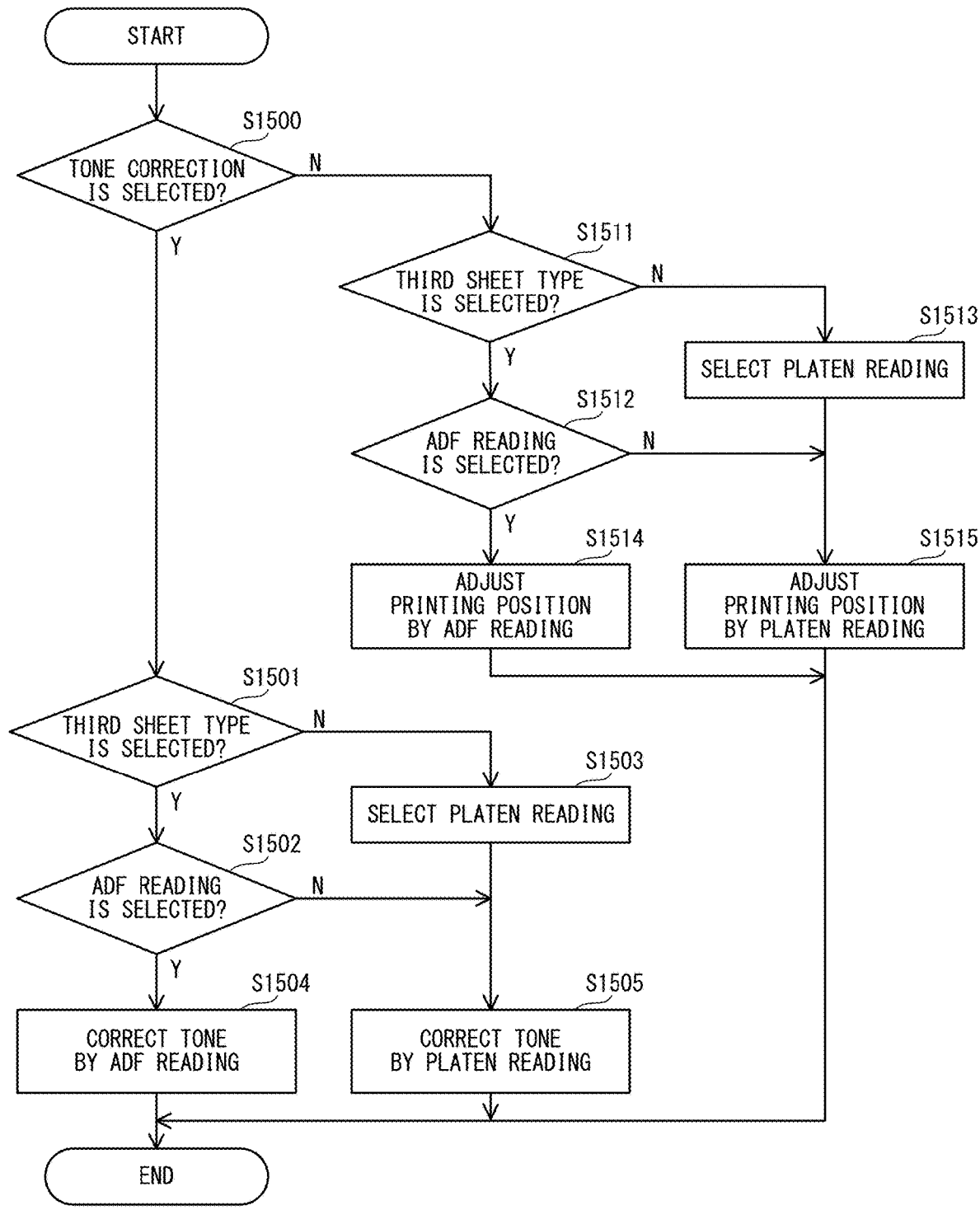
FIG. 17 is a flowchart for illustrating processing of changing a sheet type.

FIG. 17 is a flowchart for illustrating processing of changing the sheet type at the time of the ADF reading depending on the calibration type.

Calibration is started when the user uses the operation unit 400 to select calibration to be executed from among a plurality of calibration types. In at least one embodiment, calibration is started when the user uses the operation unit 400 to select any one of tone correction calibration and printing position adjustment calibration to issue an instruction to execute calibration. The CPU 401 selects the calibration type based on this instruction (Step S1500).

When tone correction calibration is selected (Step S1500: Y), the CPU 401 selects a sheet type (Step S1501). The sheet type is selected by the user issuing an instruction through the operation unit 400. When the third sheet type is selected (Step S1501: Y), the CPU 401 displays an operation screen 700*a* of FIG. 6A on the operation unit 400. As described above, the sheet of the third sheet type can be used for both of the ADF reading and the platen reading in tone correction calibration. Thus, the CPU 401 causes the user to select any one of the ADF reading and the platen reading on the operation screen 700*a* (Step S1502).

When the ADF reading is selected (Step S1502: Y), the CPU 401 executes tone correction calibration by the ADF reading (Step S1504). When the platen reading is selected (Step S1502: N), the CPU 401 executes tone correction calibration by the platen reading (Step S1505).

When a sheet type other than the third sheet type is selected (Step S1501: N), the CPU 401 displays an operation screen 700*d* of FIG. 6D on the operation unit 400. As described above, the sheet of a sheet type other than the third sheet type cannot be used for the ADF reading in tone correction calibration. Thus, the CPU 401 prompts the user to select the platen reading on the operation screen 700*d* (Step S1503). The CPU 401 executes tone correction calibration by the platen reading (Step S1505). The sheet of a sheet type other than the third sheet type cannot be used for the ADF reading in tone correction calibration, and thus the CPU 401 may execute tone correction calibration by the platen reading without displaying the operation screen 700*d*.

When printing position adjustment calibration is selected (Step S1500: N), the CPU 401 selects a sheet type (Step S1511). The sheet type is selected by the user issuing an instruction through the operation unit 400. When the second sheet type or the third sheet type is selected (Step S1511: Y), the CPU 401 displays the operation screen 700*a* of FIG. 6A on the operation unit 400. As described above, the sheet of the second sheet type and the sheet of the third sheet type can be used for both of the ADF reading and the platen reading in printing position adjustment calibration. Thus, the CPU 401 prompts the user to select any one of the ADF reading and the platen reading on the operation screen 700*a* (Step S1512).

When the ADF reading is selected (Step S1512: Y), the CPU 401 executes printing position adjustment calibration by the ADF reading (Step S1514). When the platen reading is selected (Step S1512: N), the CPU 401 executes printing position adjustment calibration by the platen reading (Step S1515).

When the first sheet type or the fourth sheet type is selected (Step S1511: N), the CPU 401 displays the operation screen 700*d* of FIG. 6D on the operation unit 400. As described above, the sheets of the first sheet type and the fourth sheet type cannot be used for the ADF reading in printing position adjustment calibration. Thus, the CPU 401 prompts the user to select the platen reading on the operation screen 700*d* (Step S1513). The CPU 401 executes printing position adjustment calibration by the platen reading (Step S1515). The sheet of the first sheet type or the fourth sheet type cannot be used for the ADF reading in printing position adjustment calibration, and thus the CPU 401 may execute printing position adjustment calibration by the platen reading without displaying the operation screen 700*d*.

In the processing described above, after the calibration type is selected, the sheet type is selected and the ADF reading or the platen reading is selected. However, the calibration type and the sheet type may be selected after any one of the ADF reading and the platen reading is selected.

In this manner, in at least one embodiment, the ADF reading using the ADF unit 220 and the platen reading are determined based on the calibration type and the sheet type.

Alternatively, the calibration type and the sheet type can be determined by performing any one of the ADF reading and the platen reading. Thus, it is possible to ensure a required accuracy at the time of calibration while at the same time improving efficiency of calibration.

Further, the CPU 401 is not limited to the configuration of controlling display of the operation unit 400. The CPU 401 may be configured not to form a test image when ADF reading is selected and a sheet of the second sheet type is selected in tone correction calibration. With this configuration, tone correction calibration is not executed in ADF reading having a low detection accuracy, and thus it is possible to ensure accurate generation of the LUTa. In this case, the CPU 401 may display an operation screen notifying of an error on the screen of the operation unit 400. When ADF reading is selected and a sheet of the third sheet type is selected in tone correction calibration, the CPU 401 controls the printer 300 so as to form a test image on the sheet.

In other cases, the CPU 401 forms a test image when the ADF reading is selected and a sheet of the second sheet type is selected in tone correction calibration, but the CPU 401 may be configured not to convey to the ADF unit 220 a sheet on which a test image is formed. With this configuration, tone correction calibration is not executed in the ADF reading having a low detection accuracy, and thus it is possible to ensure accurate generation of the LUTa. In other cases, the CPU 401 conveys to the ADF unit 220 a sheet on which a test image is formed when the ADF reading is selected and a sheet of the second sheet type is selected in tone correction calibration, but the CPU 401 may be configured not to cause the image sensor 105 to execute reading. With this configuration, tone correction calibration is not executed in the ADF reading having a low detection accuracy, and thus it is possible to ensure accurate generation of the LUTa.

In other cases, the CPU 401 executes the ADF reading when the ADF reading is selected and a sheet of the second sheet type is selected in tone correction calibration, but the CPU 401 may be configured not to generate the LUTa based on the result of reading the test image. With this configuration, the LUTa is not updated in the ADF reading having a low detection accuracy, and thus it is possible to ensure accurate generation of the LUTa. In other cases, the CPU 401 may be configured not to update the LUTa based on the result of reading the test image when the ADF reading is selected and a sheet of the second sheet type is selected in tone correction calibration. With this configuration, the LUTa is not updated in the ADF reading having a low detection accuracy, and thus it is possible to ensure accurate generation of the LUTa.

<Case of Using Image Reading Apparatus 600 Arranged Inline>

The image forming apparatus 100 can also execute calibration by using an image reading apparatus arranged inline, instead of the reader 200. Specifically, the image reading apparatus obtains a correction amount of an image based on the reading results of the image printed on a sheet, such as the color, position, and magnification of the image. The correction amount of an image is fed back to the image forming apparatus 100. The following description assumes an image reading apparatus arranged inline, but the image reading apparatus may be arranged offline and downstream of the image forming apparatus 100.

Figure 18:
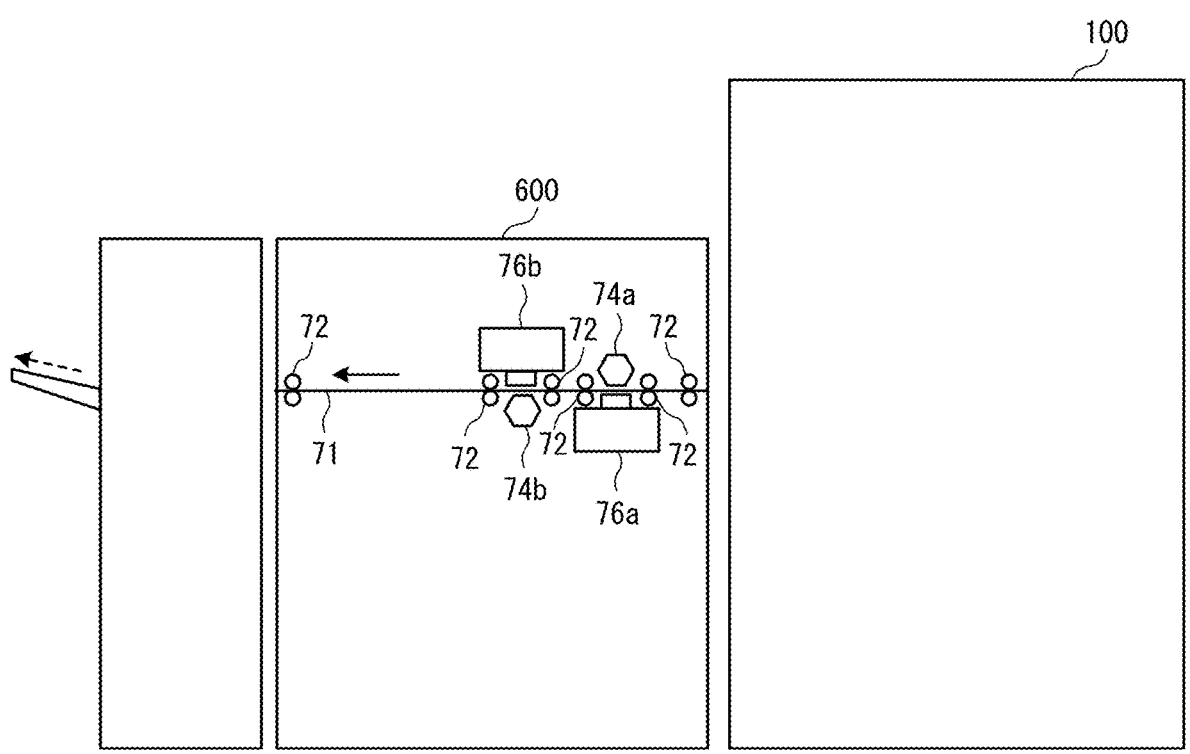
FIG. 18 is a configuration diagram of an image reading apparatus arranged inline.

FIG. 18 is a configuration diagram of the image reading apparatus arranged inline and downstream of the image forming apparatus 100. The image reading apparatus 600 conveys a sheet discharged from the image forming apparatus 100 to a conveying path 71 through conveying rollers 72. Among two scanners 76a and 76b arranged so as to sandwich the conveying path 71, the scanner 76a reads an image on one surface of a sheet while the sheet is conveyed between the scanner 76a and a background member 74a. The scanner 76b reads an image on another surface of the sheet while the sheet is conveyed between the scanner 76b and a background member 74b. The image reading apparatus 600 does not require the user to perform some work at the time of reading a sheet. Thus, efficiency of calibration is improved compared to the case of using the reader 200. Further, images of both surfaces can be read by conveying a sheet once, and thus the reading time is reduced.

For example, the scanner 76a is arranged at a position of reading a back surface of the sheet. The scanner 76b is arranged at a position of reading a front surface of the sheet. In this case, the result of reading by the scanner 76a is used for adjusting the position of the back surface in positional adjustment calibration. The result of reading by the scanner 76b is used for adjusting the position of the front surface in tone correction calibration and printing position adjustment calibration.

Also in the image reading apparatus 600, the measurement accuracy differs depending on the sheet type similarly to the ADF unit 220. For example, a difference in distance between the scanners 76a and 76b, and the sheet due to a difference between thin paper and plain paper influences the measurement accuracy.

Figure 19:
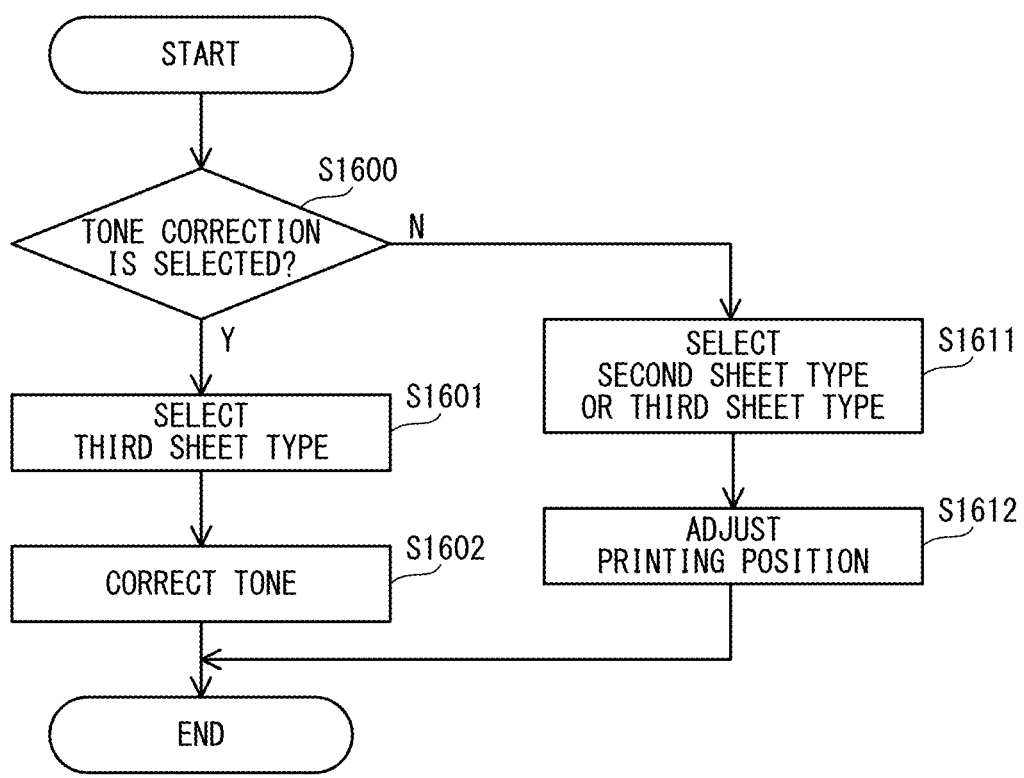
FIG. 19 is a flowchart for illustrating processing of changing a sheet type.

FIG. 19 is a flowchart for illustrating the processing of changing the sheet type depending on the type of calibration using the image reading apparatus 600.

Calibration is started when the user uses the operation unit 400 to select any one of tone correction calibration and printing position adjustment calibration to issue an instruction to execute calibration. The CPU 401 selects the type of calibration based on this instruction (Step S1600).

When tone correction calibration is selected (Step S1600: Y), the CPU 401 selects the sheet type (Step S1601). In tone correction calibration, only the sheet of the third sheet type can be used for the flow reading. Thus, the CPU 401 selects the third sheet type. The CPU 401 executes tone correction calibration using the image reading apparatus 600 based on the sheet of the third sheet type (Step S1602).

When printing position adjustment calibration is selected (Step S1600: N), the CPU 401 selects the sheet type (Step S1611). In printing position adjustment calibration, the sheets of the second sheet type and the third sheet type can be used for the flow reading. The sheet type is selected by the user issuing an instruction through the operation unit 400. The CPU 401 executes printing position adjustment calibration using the image reading apparatus 600 based on the sheet of the selected sheet type (Step S1612).

In the processing described above, the flow reading and the platen reading using the image reading apparatus 600 are determined based on the calibration type and the sheet type. Thus, it is possible to ensure a required accuracy at the time of calibration while at the same time improving efficiency of calibration.

As described above, when calibration is executed by using a sheet, the image forming apparatus 100 can read a test image by the document scanner 210 while conveying a test chart using the ADF unit 220. When a test chart is created through use of a sheet of a type that cannot ensure the accuracy of calibration through conveyance by the ADF unit 220, the image forming apparatus 100 fixes the test chart on the platen 102, and reads a test image by the document scanner 210. The image forming apparatus 100 executes calibration based on the result of reading the test image. The efficiency of calibration is improved by using the ADF unit 220. Further, when the accuracy cannot be ensured by using the ADF unit 220, it is possible to ensure the accuracy of calibration by fixing a test chart on the platen 102 and reading the test chart. In this manner, according to at least one embodiment of the present disclosure, it is possible to ensure a required accuracy at the time of calibration while at the same time improving the efficiency of calibration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-165383, filed Sep. 11, 2019, which is hereby incorporated by reference herein in its entirety.

What is claimed is:

1. An image forming apparatus comprising:
an image former configured to form an image;
a conveyor configured to convey a sheet having a test image formed thereon to read the test image, wherein the test image is formed by the image former;
a scanner configured to read, while the sheet having the test image formed thereon is being conveyed by the conveyer, the test image on the sheet; and
a controller configured to:
execute first calibration in which a density of an image to be formed by the image former is controlled based on a result of reading by the scanner; and
execute second calibration in which a geometric characteristic of the image to be formed by the image former is controlled based on a result of reading by the scanner, and
wherein the controller allows usage of the sheet of a first type in the first calibration,
wherein the controller prevents usage of the sheet of a second type different form the first type in the first calibration,
wherein the controller allows usage of the sheet of the first type in the second calibration, and
wherein the controller allows usage of the sheet of the second type in the second calibration.

2. The image forming apparatus according to claim 1, wherein a basis weight of the sheet of the second type is smaller than a basis weight of the sheet of the first type.

3. The image forming apparatus according to claim 1,
wherein, in the first calibration, the controller controls the image former to form a first test image, obtains first reading data related to the first test image on a first sheet, and controls the density of the image to be formed by the image former based on the first reading data, and
wherein, in the second calibration, the controller controls the image former to for a second test image, obtains second reading data related to the second test image on a second sheet, and controls the geometric characteristic of the image to be formed by the image former based on the second reading data.

4. The image forming apparatus according to claim 1,
wherein, in the first calibration, the scanner reads the sheet of the first type conveyed by the conveyor, and wherein, in the first calibration, the scanner is prevented from reading the sheet of the second type conveyed by the conveyor.

5. The image forming apparatus according to claim 1,
wherein, in the first calibration, the controller is configured to perform controlling the density of the image to be formed by the image former based on the result of reading the sheet of the first type, and
wherein, in the first calibration, the controller is configured to not perform controlling the density of the image to be formed by the image former based on the result of reading the sheet of the second type.

6. The image forming apparatus according to claim 1,
wherein the scanner includes an image sensor configured to read an original,
wherein the image former is configured to form a copy image of the original based on reading data obtained by the sensor, and
wherein the conveyor includes a document feeder configured to convey the original to the sensor.

7. The image forming apparatus according to claim 1,
wherein the image former includes a fixing heater configured to fix the image, and
wherein the scanner is arranged downstream of the fixing heater in a direction of conveying the sheet by the conveyor.

8. The image forming apparatus according to claim 1, wherein, in the first calibration, the controller generates a tone correction table based on the result of reading by the scanner.

9. An image forming apparatus comprising:
an image former configured to form an image;
a document feeder configured to feed a sheet having a test image formed thereon to read the test image formed by the image former;
a platen;
an image sensor configured to read the test image on the sheet placed on the platen, and to read, while the sheet having the test image formed thereon is being fed by the document feeder, the test image on the sheet;
a display;
a controller configured to:
obtain sheet information related to a type of the sheet on which the test image is formed;
obtain calibration information related to calibration to be executed among a plurality of calibrations;
control the display based on the sheet information and the calibration information;
control the image former to form a first test image used in a first calibration included in the plurality of calibrations;
control the image former to form a second test image used in a second calibration, which is different from the first calibration included in the plurality of calibrations;
control the image sensor to read the first test image on the sheet placed on the platen;
control the image sensor to read the second test image on the sheet placed on the platen;
control the document feeder to feed the sheet having the first test image formed thereon;
control the document feeder to feed the sheet having the second test image formed thereon;
control the image sensor to read the first test image on the sheet fed by the document feeder;
control the image sensor to read the second test image on the sheet fed by the document feeder;
control density of the image to be formed by the image former based on a reading result of the first test image by the image sensor;
control a geometric characteristic of the image to be formed by the image former based on a reading result of the second test image by the image sensor;
wherein, in a case where the first test image is formed on a first sheet of a first type in the first calibration, the controller is configured to display a first selection screen on the display for urging the user to select one of 1) reading the first test image on the first sheet placed on the platen or 2) reading the first test image on the first sheet while the first sheet is being fed by the document feeder,
wherein, in a case where the first test image is formed on a second sheet of a second type, which is different from the first type, in the first calibration, the controller is configured to display a screen on the display for urging the user to place the second sheet on the platen,
wherein, in a case where the second test image is formed on a third sheet of the first type in the second calibration, the controller is configured to display a second selection screen on the display for urging the user to select one of 3) reading the second test image on the third sheet placed on the platen or 4) reading the second test image on the third sheet while the third sheet is being fed by the document feeder,
wherein, in a case where the first test image is formed on a fourth sheet of the second type, which is different from the first type, in the second calibration, the controller is configured to display a third selection screen on the display for urging the user to select one of 5) reading the second test image on the fourth sheet placed on the platen or 6) reading the second test image on the fourth sheet while the fourth sheet is being fed by the document feeder.

10. The image forming apparatus according to claim 9,
wherein a basis weight of the second sheet of the second type is smaller than a basis weight of the first sheet of the first type.

11. The image forming apparatus according to claim 9,
wherein the basis weight of the second sheet of the second type is smaller than a predetermined basis weight, and
wherein the basis weight of the first sheet of the first type is larger than or equal to the predetermined basis weight.

12. The image forming apparatus according to claim 9,
wherein the basis weight of the first sheet of the first type is larger than a first basis weight and smaller than a second basis weight, and
wherein the basis weight of the second sheet of the second type is larger than a third basis weight, which is larger than the first basis weight, and smaller than the second basis weight.

* * * * *